(12) United States Patent
Garner

(10) Patent No.: US 9,359,678 B2
(45) Date of Patent: *Jun. 7, 2016

(54) USE OF CHARGED CELLULOSE NANOCRYSTALS FOR CORROSION INHIBITION AND A CORROSION INHIBITING COMPOSITION COMPRISING THE SAME

(71) Applicant: Nanohibitor Technology Inc., Vancouver (CA)

(72) Inventor: Andrew Garner, Vancouver (CA)

(73) Assignee: NANOHIBITOR TECHNOLOGY INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/974,294

(22) Filed: Dec. 18, 2015

(65) Prior Publication Data

US 2016/0102409 A1    Apr. 14, 2016

Related U.S. Application Data

(63) Continuation-in-part of application No. 14/150,749, filed on Jan. 8, 2014, now Pat. No. 9,222,174, which is a continuation-in-part of application No. 13/935,483, filed on Jul. 4, 2013, now abandoned, which is a continuation-in-part of application No. 13/935,477, filed on Jul. 3, 2013, now abandoned.

(60) Provisional application No. 61/668,001, filed on Jul. 4, 2012.

(51) Int. Cl.
| | |
|---|---|
| *C23F 11/10* | (2006.01) |
| *C23F 11/04* | (2006.01) |
| *C23F 11/14* | (2006.01) |
| *C23F 11/173* | (2006.01) |

(52) U.S. Cl.
CPC ............. *C23F 11/04* (2013.01); *C23F 11/10* (2013.01); *C23F 11/143* (2013.01); *C23F 11/173* (2013.01)

(58) Field of Classification Search
CPC .......... C23F 11/00; C23F 11/04; C23F 11/06; C23F 11/10; C23F 11/122
USPC ............................................. 422/7, 12, 13, 16
See application file for complete search history.

(56) References Cited

U.S. PATENT DOCUMENTS

| | | |
|---|---|---|
| 4,134,959 A | 1/1979 | Menke et al. |
| 4,378,381 A | 3/1983 | Turbak et al. |
| 4,402,747 A | 9/1983 | Bird et al. |
| 4,536,302 A | 8/1985 | Augsburger et al. |
| 4,587,028 A | 5/1986 | Darden |
| 4,675,158 A | 6/1987 | Klindera |
| 5,080,818 A | 1/1992 | Tachiiwa et al. |
| 5,326,529 A | 7/1994 | Miksic et al. |
| 5,352,383 A | 10/1994 | Johnson et al. |
| 5,597,514 A | 1/1997 | Miksic et al. |
| 5,616,544 A | 4/1997 | Kalota et al. |
| 5,750,053 A | 5/1998 | Miksic et al. |
| 5,854,145 A | 12/1998 | Chandler et al. |
| 6,033,599 A | 3/2000 | Lozano et al. |
| 6,085,905 A | 7/2000 | Miksic et al. |
| 6,103,790 A | 8/2000 | Cavaille et al. |
| 6,280,528 B1 | 8/2001 | Kharshan et al. |
| 6,306,210 B1 | 10/2001 | Miksic et al. |
| 6,576,155 B1 | 6/2003 | Barbera-Guillem |
| 6,585,933 B1 | 7/2003 | Ehrhardt et al. |
| 6,800,594 B2 | 10/2004 | Miksic et al. |
| 6,982,062 B2 | 1/2006 | DeCordt et al. |
| 7,014,694 B1 | 3/2006 | Miksic et al. |
| 7,048,873 B1 | 5/2006 | Miksic et al. |
| 7,118,615 B1 | 10/2006 | Miksic et al. |
| 7,125,441 B1 | 10/2006 | Furman et al. |
| 7,241,391 B1 | 7/2007 | Miksic et al. |
| 7,264,707 B1 | 9/2007 | Furman et al. |
| 7,297,191 B1 | 11/2007 | Miksic et al. |
| 7,541,089 B1 | 6/2009 | Miksic et al. |

(Continued)

FOREIGN PATENT DOCUMENTS

| | | |
|---|---|---|
| EP | 0 468 710 B1 | 5/2000 |
| EP | 2 236 664 A1 | 10/2010 |

(Continued)

OTHER PUBLICATIONS

"Reducing Sugar" from Wikipedia, Nov. 13, 2011, as found on the WayBackMachine: https://web.archive.org/web/20111113231505/ http//en.wikipedia.org/wiki/Reducing_sugar.
"Molasses" from Wikipedia, Nov. 16, 2011, as found on the WayBackMachine: https://web.archive.org/web/20111116035405/ http://en.wikipedia.org/wiki/Molasses.
"Sucrose" from Wikipedia, Sep. 25, 2011, as found on the WayBackMachine: https://web.archive.org/web/20110925231354/ http://en.wikipedia.org/wiki/Sucrose.

(Continued)

*Primary Examiner* — Sean E Conley
*Assistant Examiner* — Donald Spamer
(74) *Attorney, Agent, or Firm* — Cameron IP

(57) ABSTRACT

There is provided the use of cellulose nanocrystals as a corrosion inhibitor for inhibiting corrosion of a metal object made of steel. The use includes using acid to impart ester groups onto the cellulose nanocrystals. The use includes dispersing an effective corrosion inhibiting amount of the cellulose nanocrystals having the ester groups within a composition comprising a carrier essentially consisting of water. The cellulose nanocrystals are provided in an amount equal to or greater than 0.1% by weight of the carrier and equal to or less than 3.0% by weight of the carrier. The use includes applying an effective corrosion inhibiting amount of the composition to the metal object such that the composition is adapted to inhibit corrosion of the metal object by 8% or more.

20 Claims, 17 Drawing Sheets

(56) References Cited

U.S. PATENT DOCUMENTS

| | | | |
|---|---|---|---|
| 7,588,820 B2 | 9/2009 | Berg et al. |
| 7,708,939 B2 | 5/2010 | Duke et al. |
| 7,763,213 B2 | 7/2010 | Miksic et al. |
| 8,241,765 B2 | 8/2012 | Barbera-Guillem |
| 8,460,572 B2 | 6/2013 | Boluk et al. |
| 2005/0017220 A1 | 1/2005 | DeCordt et al. |
| 2005/0137291 A1 | 6/2005 | Schneider |
| 2005/0256262 A1 | 11/2005 | Hill et al. |
| 2007/0196975 A1 | 8/2007 | Nomura et al. |
| 2008/0146701 A1 | 6/2008 | Sain et al. |
| 2008/0305182 A1 | 12/2008 | Ramirez et al. |
| 2010/0098987 A1 | 4/2010 | Woyciesjes et al. |
| 2010/0119736 A1 | 5/2010 | Yan et al. |
| 2010/0143681 A1 | 6/2010 | Yano et al. |
| 2010/0279019 A1 | 11/2010 | Beck et al. |
| 2010/0327215 A1 | 12/2010 | Boluk et al. |
| 2011/0101240 A1 | 5/2011 | Barbera-Guillem |
| 2012/0015176 A1 | 1/2012 | Riebel et al. |
| 2013/0048917 A1 | 2/2013 | Virtanen et al. |
| 2013/0065026 A1 | 3/2013 | Walther et al. |
| 2013/0145957 A1 | 6/2013 | Shchukin et al. |
| 2013/0273350 A1 | 10/2013 | Lee et al. |
| 2013/0345341 A1 | 12/2013 | Harada et al. |
| 2014/0004340 A1 | 1/2014 | Saastamoinen et al. |

FOREIGN PATENT DOCUMENTS

| | | | |
|---|---|---|---|
| WO | 2008069936 A1 | 6/2008 |
| WO | 2010062002 A1 | 6/2010 |
| WO | 2010066036 A1 | 6/2010 |
| WO | 2011/124759 A1 | 10/2011 |
| WO | 2013/033562 A2 | 3/2013 |
| WO | 2013/134062 A1 | 9/2013 |

OTHER PUBLICATIONS

International Search Report and Written Opinion for PCT/CA2014/000544, dated Oct. 28, 2014.

"Cooking Molasses", Jan. 17, 2011, Crosby Molasses Co. Ltd., Saint John, New Brunswick, Canada.

"Lactose (Milk Sugar)" (date unknown), Waspie Valley Creamery Inc., Iowa, USA.

"Barley Malt Syrup" from Wikipedia, Jul. 18, 2009, as found on the WayBackMachine: https://web.archive.org/web/20090718041523/http://en.wikipedia.org/wiki/Barley_malt_syrup.

"Ammonium", Wikipedia. Archived version from May 24, 2011.

Modiya et al. Synthesis and screening of antibacterial and antifungal activity of 5-chloro-1,3-benzoxazol-2(3 h)-one derivative. Organic and Medicinal Chemistry Letters 2012, 2:29.

The Organics Institute. 10 Tips on How to Avoid Harmful Preservatives in Your Diet. Jul. 30, 2012.

"Ethylene Glycol". Wikipedia. Archived version from May 13, 2011.

"Propylene Glycol". Wikipedia. Archived version from May 18, 2011.

"Cellulose". Wikipedia. Archived version from May 17, 2011.

Baker, A.J., "Corrosion of Metal in Wood Products," Durability of Building Materials and Components. ASTM STP 691. P.J. Sereda and G.G. Litvan, Eds., American Society for Testing and Materials, 1980, pp. 981-993.

"Guides to practice in Corrosion Control: Corrosion of Metals by Wood", as set out in www.npl.co.uk/upload/pdf/corrosion_of_metals_by_wood.pdf, National Physical Laboratory, Hampton Road, teddington, Middlesex, TW11 0LW, England, and as found on WayBackMachine dated Mar. 4, 2011: https://web.archive.org/web/20110304051809/http://www.npl.co.uk/upload/pdf/corrosion_of_metals_by_wood.pdf.

Beck-Candanedo et al. Effect of reaction conditions on the properties and behavior of wood cellulose nanocrystal suspensions. Biomacromolecules 2005, 6, 1048-1054.

Hirai et al. Phase separation behavior in aqueous suspensions of bacterial cellulose nanocrystals prepared by sulfuric acid treatment. Langmuir, 25, 497-502. 2009.

Hamad Wy and Hu Tq, "Structure-process-yield interrelations in nanocrystalline cellulose extraction", The Canadian Journal of Chemical Engineering, Jun. 2010, pp. 392-402, vol. 88, Vancouver, Canada.

Hasani et al. Cationic Surface functionalization of cellulose nanocrystals. Soft Matter, 2008, 4, 2238-2244.

"Nanocrystalline Cellulose, Material Data Safety Sheet", prepared by FPInnovations on Oct. 31, 2011, revised on Apr. 16, 2012.

USE OF CHARGED CELLULOSE NANOCRYSTALS FOR CORROSION INHIBITION AND A CORROSION INHIBITING COMPOSITION COMPRISING THE SAME

FIELD OF THE INVENTION

The present invention relates to corrosion inhibition. In particular, the invention relates to the use of charged cellulose nanocrystals for corrosion inhibition, as well as a corrosion inhibiting composition that includes charged cellulose nanocrystals.

DESCRIPTION OF THE RELATED ART

Corrosion inhibitors per se are well known to those skilled in the art. They may function to inhibit the extent to which a metal corrodes, thereby acting to extend the life of metal-containing industrial equipment, infrastructure, consumer goods and the like. Corrosion inhibitors may thus be useful across a wide range of industries.

Some inhibitors, such as azole compounds, are widely known to those skilled in the art and may be effective in a variety of applications. For example, U.S. Pat. No. 4,134,959 to Menke et al. provides a composition and method for inhibiting corrosion. The composition consists essentially of an azole and a water-soluble phosphate in an effective combination to inhibit corrosion in both ferrous and non-ferrous metals. However, azole compounds may be relatively expensive.

On the other hand, other inhibitors may be less costly but not as effective at inhibiting corrosion compared to some more costly inhibitors.

Still further inhibitors may satisfy one or more of the above criteria regarding effectiveness and cost, but may cause residual and harmful effects to the environment.

There is accordingly a need for an improved corrosion inhibitor that may overcome one or more of the above disadvantages.

There are also a large number of corrosion inhibitors on the market of varying degrees of effectiveness. There is accordingly a further need for a corrosion inhibiting agent which may function in a manner to enhance the effectiveness of known corrosion inhibitors when added in relatively small amounts. Such an agent may provide a competitive advantage to industry leaders by enhancing the effectiveness of and expanding the potential range of applications for their current inventory of products.

BRIEF SUMMARY OF INVENTION

It is object of the present invention to provide, and the present invention discloses herein, an improved corrosion inhibitor and method for inhibiting corrosion of metals.

There is accordingly provided the use of cellulose nanocrystals as a corrosion inhibitor for inhibiting corrosion of a metal object made of steel. The use includes using acid to impart ester groups onto the cellulose nanocrystals. The use includes dispersing an effective corrosion inhibiting amount of said cellulose nanocrystals having said ester groups within a composition comprising a carrier essentially consisting of water. The cellulose nanocrystals are provided in an amount equal to or greater than 0.1% by weight of the carrier and equal to or less than 3.0% by weight of the carrier. The use includes applying an effective corrosion inhibiting amount of said composition to the metal object such that the composition is adapted to inhibit corrosion of said metal object by 8% or more.

According to another aspect, there is accordingly provided the use of cellulose nanocrystals as a corrosion inhibitor for inhibiting corrosion of a metal object made of steel. The use includes imparting ester groups onto the cellulose nanocrystals. The use includes dispersing an effective corrosion inhibiting amount of said cellulose nanocrystals having said ester groups within a composition comprising a carrier essentially consisting of water. The cellulose nanocrystals are provided in an amount equal to or greater than 0.1% by weight of the carrier and equal to or less than 3.0% by weight of the carrier. The use includes applying an effective corrosion inhibiting amount of said composition to the metal object such that the composition is adapted to inhibit corrosion of said metal object by 8% or more.

According to a further aspect, one or more of the above set out compositions additionally includes an effective corrosion inhibiting amount of at least one of the following compounds: polycarboxilic acid; fatty acid alkanolamide; ammonium benzoate; ethanolamine; monoethaneamine benzoate; ethanol ammonium benzoate; imidazole; tall oil hydroxyethyl imidazoline; 2-imidazoline-1-ethanol, 2-heptadecyl-; 1H-imidazole-1-ethanol, 2-(8-heptadecen-1-yl)-4,5-dihydro-; ethanol, 2-(2-aminoethoxy)-; benzotriazole; 2-mercaptobenzothiazole; 1,2benzisothiazoline-3-1; 2-benzimidazolone; 4,5,6,7-tetrahydrobenzotrazole; tolylimidazolone; tolyltriazole; and 2(5-ethyl-2-pyridyl)benzimidazole.

According to a yet another aspect, there is provided the use of cellulose nanocrystals as a corrosion inhibitor for inhibiting corrosion of a metal object made of aluminium. The use includes using acid to impart ester groups onto the cellulose nanocrystals. The use includes dispersing an effective corrosion inhibiting amount of said cellulose nanocrystals having said ester groups within a composition comprising a carrier essentially consisting of water. The cellulose nanocrystals are provided in an amount equal to or greater than 0.2% by weight of the carrier and equal to or less than 2.0% by weight of the carrier. The use includes applying an effective corrosion inhibiting amount of said composition to the metal object such that the composition is adapted to inhibit corrosion of said metal object by 38% or more.

According to yet further aspect, there is provided a compound that includes a cellulose nanocrystal. The cellulose nanocrystal has a surface. The compound includes an ester group bonded to the surface of the cellulose nanocrystal. The compound includes a metal bonded to the ester group.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
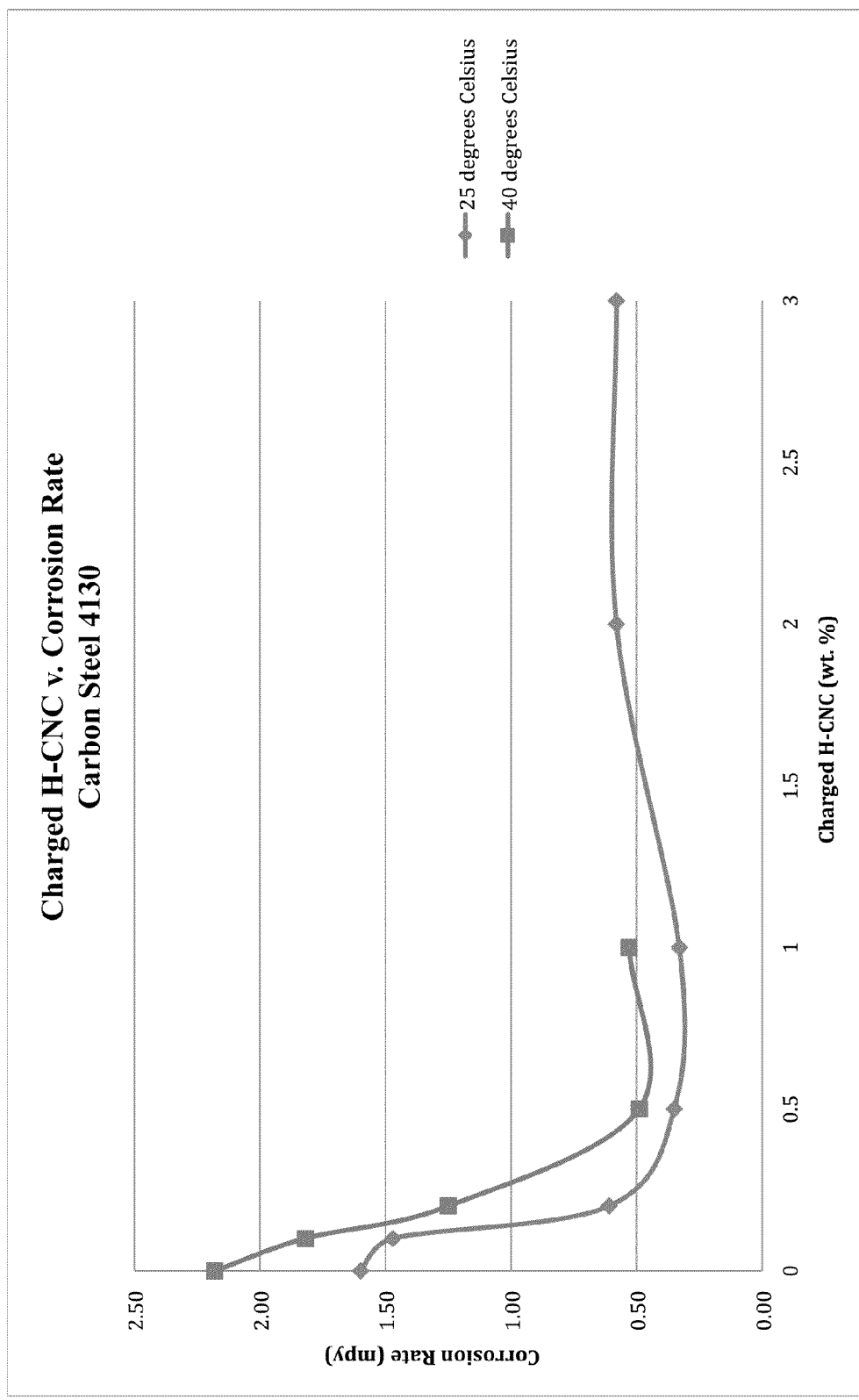
FIG. 1 is a line graph of showing the results of a coupon jar test for carbon steel 4130 in which charged, acid-form cellulose nanocrystals ("charged H-CNC") were added in varying amounts to sea-salt solutions and tested at temperatures of 25 and 40 degrees Celsius, where corrosion rate in mils per year (mpy) is shown as a function of the amount of charged H-CNC as a percent by weight of the carrier.

Cellulose nanocrystals are rod-shaped needles that are highly crystalline, rigid and shorter than nanofibrils, for example. Cellulose nanocrystals may be obtained via acid hydrolysis, for example. Cellulose nanocrystals may have a length/diameter ratio of about 20 to 200 and a diameter preferably less than about 60 nm, a diameter preferably in the range of 4 nm to about 60 nm, a diameter more preferably in the range of 4 nm to about 15 nm, and a length of less than about 350 nm, and preferably in a range of about 150 nm to about 350 nm. Cellulose nanocrystals as referred to herein may alternatively be referred to as nanocrystalline cellulose. Cellulose nanocrystals may be purchased at CelluForce Inc., which has an office at 625 President Kennedy, Montréal, Québec, H3A 1K2.

Cellulose nanocrystals have traditionally been used for their mechanical properties and film-forming properties. Indeed, neutral-form cellulose nanocrystals do not appear to have any readily discernible beneficial effect on the corrosion rate for metals. This is evidenced by the below set out in representative Examples 1 and 2.

Example 1

Corrosion rates were obtained by immersing coupons of ferrous metal, in this example a common steel in the form of carbon steel 4130, in typical seawater compositions for 34 days and then removing the coupons. The loss of the mass of the coupons arising from the corrosion was then measured. The coupons were tested at an ambient temperature of approximately 25 degrees Celsius. The coupons were kept within jars, with each jar having a lid with an aperture extending therethrough.

The masses of the coupons were determined before and after the 34-day period to an accuracy of $\pm 10^{-5}$ grams. Mils per year (mpy) rates were obtained thereby following the protocol outlined in the NACE International Corrosion Engineers Reference Book, $2^{nd}$ Edition, as set out on pages 78 and 79 therein. This book may be obtained at NACE International, which has an address at 1440 South Creek Drive, Houston, Tex., 7084-4906, USA.

Each of the jars contained a carrier essentially consisting of water, in this example in the form of water in the amount of 800 grams. Each of the jars also included approximately 28.8 grams of sea salt. Each jar thus had sea salt in the amount of about 3.6% by weight of the water, thus approximating typical seawater. The sea salt used in this example and all other examples set out below was Agenco™ sea salt, which may be purchased at Whole Foods Market IP. L.P., having one address at 2285 West 4th Ave, Vancouver, British Columbia, Canada.

Dried, neutral-form cellulose nanocrystals, in this example sodium-form cellulose nanocrystals, were added to respective ones of the jars in various amounts. The sodium-form cellulose nanocrystals may be referred to as a compound of formula $R_3$-$R_2$ in which $R_3$ is a sodium atom (Na) and $R_2$ is a cellulose nanocrystal (CNC). Sodium-form cellulose nanocrystals may thus be hereinafter referred to as Na-CNC.

The Na-CNC was obtained by first extracting the cellulose nanocrystals through acid hydrolysis. The cellulose nanocrystals so extracted then had their proton counterions replaced with monovalent cationic counterions to obtain the dried solid form Na-CNC. The details of this process are set out, for example, in International Patent Publication No. WO 2010/066036 A1 to Beck et al., the disclosure of which is incorporated herein by reference. In this example, the monovalent cationic counterions are sodium ions, though this is not strictly required. The dried-form Na-CNC as described above, was added in amounts of 0, 0.8, 1.6, 4.0 and 8.0 grams to respective ones of the jars. The amounts of Na-CNC correspond to compositions having amounts of Na-CNC of 0, 0.1, 0.2, 0.5 and 1.0 as a percent by weight of the carrier. The results of the testing are set out in Table 1 below and evidence that neutral-form cellulose nanocrystals do not generally have any readily discernible beneficial effect on the corrosion rate for ferrous metals.

TABLE 1

Steel Corrosion Rates (mpy) at 25° C.

| | Na—CNC (wt. %) | | | | |
|---|---|---|---|---|---|
| | 0 | 0.1 | 0.2 | 0.5 | 1.0 |
| Corrosion rate (mpy) | 1.60 | 1.71 | 1.43 | 1.62 | 1.77 |

Example 2

In this example corrosion rates were obtained by immersing coupons of aluminium 2024-T3 and UNS C27000 Yellow Brass in typical seawater compositions. The testing conditions and means for determining corrosion rates were otherwise similar to Example 1 with the exception that the coupons were kept within sealed jars, the testing occurred over a 32 day period, and each jar comprised 500 grams of water and 25 grams of sea salt. A first set of jars of aluminium and brass had 0 grams of Na-CNC and a second set of jars of aluminium and brass included 34 grams of Na-CNC added thereto (6.8% by weight of the carrier). The results of the testing are set out in Table 2 below.

TABLE 2

Aluminium and Brass
Corrosion Rates (mpy) at 25° C.

| | Metal | | | |
|---|---|---|---|---|
| | Aluminum | | Brass | |
| | Na—CNC (wt. %) | | | |
| | 0 | 6.8 | 0 | 6.8 |
| Corrosion rate (mpy) | 0.00 | 0.40 | 0.10 | 0.20 |

The results evidence that the corrosion rates of aluminium and brass increase when Na-CNC is added to the carrier.
1. Charged Cellulose Nanocrystals as a Corrosion Inhibitor for Metals
1.1 Ferrous Metals and Charged Cellulose Nanocrystals In contrast to the above, cellulose nanocrystals in charged acid-form may be particularly effective in inhibiting the corrosion of ferrous metals. An exemplary set of results in this regard is shown in the Example 3 set out below.

Example 3

Corrosion rates were obtained by immersing coupons of steel (carbon steel 4130) in a corrosion environment in this example typical seawater compositions, measuring the loss of mass of the coupons due to corrosion after 34 days, and determining the mils per year loss in the manner set out in Example 1. The coupons were kept within jars with each jar having a lid with an aperture extending therethrough. Each jar included a carrier essentially consisting of water in the amount of 800 grams and 28.8 grams of sea salt (3.6% by weight of the carrier) to approximate the typical amount of salt in sea water. The coupons were fully submerged within this solution.

Charged, acid-form cellulose nanocrystals (hereinafter "charged H-CNC") was added in varying amounts to the various jars from a stock of 3% charged H-CNC held in suspension in distilled water. The H-CNC was obtained via acid hydrolysis and results in the cellulose nanocrystals have ester groups on the surfaces thereof. In this example, charged H-CNC comprised cellulose nanocrystals having a formula $R_1$-$R_2$ in which $R_1$ is one or more negatively charged ester groups and $R_2$ is a cellulose nanocrystal (CNC). Sulfuric acid was used in the acid hydrolysis process and the ester groups $R_1$ were thus negatively charged sulfate ester groups in this example.

However, this type of acid is not strictly required and in other examples, other acids may used to form H-CNC, such as hydrochloric acid, phosphoric acid, hydrobromic acid, carboxylic acid and the like may be used in other examples.

The 3% charged H-CNC stock was obtained from dried Na-CNC as described above in Example 1. In order to obtain 3% charged H-CNC stock in suspension in distilled water, 3% of Na-CNC as a percent by weight of water was added to two liters of distilled water. The mixture was then continuously stirred for a minimum of twelve hours in this example, though this is not strictly required. The mixture was next sonicated for a minimum of ten minutes; here too this is not strictly required. Lastly, 300 microliters of 64% sulfuric acid ($H_2SO_4$) were added to the mixture until a pH of 3 was obtained.

The 3% charged H-CNC stock was added in various amounts to a first set of jars tested at 25 degrees Celsius so as to obtain 0, 0.8, 1.6, 4.0, 8.0, 16.0 and 24.0 grams of charged H-CNC in respective ones of the jars. This corresponds to compositions having 0, 0.1, 0.2, 0.5, 1.0, 2.0 and 3.0% of charged H-CNC as a percent by weight of the water and may have pH levels of 7.0, 4.5, 4.2, 3.8, 3.5, 3.2 and 3.0, respectively, in this example. This set of jars was tested at an ambient temperature of 25 degrees Celsius and a second set of jars was tested at 40 degrees Celsius. Compositions comprising a carrier essentially consisting of water and charged H-CNC result in stable aqueous suspensions arising from electrostatic repulsion of the colloidal, charged H-CNC. The results of the testing are set out in Table 3 below and graph seen in FIG. 1.

TABLE 3

Steel Coupon Weight Loss in mils per year (mpy) except as marked

| | Charged H—CNC (wt. %) | | | | | | |
|---|---|---|---|---|---|---|---|
| Temperature | 0 | 0.1 | 0.2 | 0.5 | 1 | 2 | 3 |
| 5° C. | 1.54 | — | — | — | 0.76 | — | — |
| 25° C. | 1.60 | 1.47 | 0.61 | 0.35 | 0.33 | 0.58 | 0.58 |
| 40° C. | 2.18 | 1.82 | 1.25 | 0.49 | 0.53 | — | — |
| 70° C. | 2.26 | — | — | — | 1.43 | — | — |
| 150° C.* | 0.81 lb/ft²* | — | — | 0.70 lb/ft²* | — | — | — |

*Test performed with a P110 grade steel coupon positioned within an autoclave at a pressure of over 50 psig and in which the coupon was submerged in an aqueous solution comprising 15% HCl and tested at a temperature of about 150 degrees Celsius.

The test result for jars having compositions of 0 and 1.0% of charged H-CNC as a percent by weight of the water are also shown in Table 3 for conditions in which the coupons subjected to 5 degrees Celsius and 70 degrees Celsius, respectively.

The results demonstrate that the corrosion rate of ferrous metals, in this example steel, decreases as the percentage of charged H-CNC within the various compositions of the jars increases from 0 to 1% by weight of the carrier. As seen in FIG. 1, for the coupons at a temperature of 25 degrees Celsius, the corrosion rate decreases from 1.60 to 0.33 in mils per year (mpy) in an at least partially inverse manner as the amount of charged H-CNC increases from 0 to 1.0% by weight of the carrier. For the coupons at a temperature of 40 degrees Celsius, the corrosion rate decreases from 2.18 to 0.53 in mils per year (mpy) in an at least partially inverse manner as the amount of charged H-CNC increases from 0 to 1.0% by weight of the carrier. According to one aspect, the effective amount of charged H-CNC in the composition is thus preferably equal to or less than 1% by weight of the carrier.

The compositions comprising charged, acid-form cellulose nanocrystals in amounts equal to or less than 1% by weight of the carrier contained cellulose nanocrystals in a stabilized aqueous suspension, with the composition being thin and having a low viscosity. The compositions may have a viscosity that is no more than 125% of the viscosity of water at ambient temperatures, according to one example.

In contrast, the compositions having 2% and 3% charged H-CNC by weight of the carrier formed gel-like compositions and resulted in corrosion rates that were less effective, namely in the order of 0.58 mpy. This rate of corrosion inhibition was substantially similar to when only 0.2% charged H-CNC by weight of the carrier was added for the same conditions. Nonetheless, the corrosion rates for compositions having 2% and 3% charged H-CNC by weight of the carrier were found to still be less than the control tests in which 0 H-CNC was added.

For a test temperature of 25 degrees Celsius, the results show that corrosion rates dropped from 1.60 mpy to 1.47 mpy when 0.1% of charged H-CNC by weight of the carrier was added. This amounts to a corrosion rate drop of about 8%.

The results show that the corrosion rate of the coupons significantly decreases or dips within an amount of charged H-CNC of 0 and 0.5% by weight of the carrier for test temperatures of 25 and 40 degrees Celsius: for the coupons at 25 degrees Celsius, the corrosion rate decreased from 1.60 to 0.35 mpy; and for the coupons at 40 degrees Celsius, the corrosion rate decreased from 2.18 to 0.49 mpy. The amount of corrosion appears to generally level off as more charged H-CNC is added thereafter. According to one aspect, the graph shows that the amount of charged H-CNC for effective inhibition may be equal to or less than 0.6% by weight of the carrier.

The results show that the steepest decrease in corrosion rate occurred when the amount of charged H-CNC increased from 0.1 to 0.2% by weight of the carrier for test temperatures of 25 and 40 degrees Celsius: for the coupons at 25 degrees, the corrosion rate decreased from 1.47 to 0.61 mpy; and for the coupons at 40 degrees, the corrosion rate decreased from 1.82 to 1.25 mpy. According to another aspect, the charged H-CNC is thus preferably included in an amount substantially equal to at least 0.1% by weight of the carrier.

For the coupons at 25 degrees Celsius, the rate of corrosion appears to decrease in a more gradual manner as the amount of charged H-CNC increases by more than 0.2% by weight of the carrier. The rate of corrosion decreases in an even more gradual manner at an amount of charged H-CNC of 0.3% or more by weight of the carrier. The rate of corrosion appears to substantially level off when the amount of charged H-CNC is added to an amount of 0.5 to 1.0% by weight of the carrier: the corrosion rate decreases from 0.35 to 0.33 mpy in this regard. This trend points to the conclusion that effective corrosion inhibition continues to occur when charged H-CNC is added in amounts greater than 1.0% by weight of the carrier.

For the coupons at 40 degrees Celsius, the rate of corrosion appears to generally level off at an amount of charged H-CNC of about 0.5% by weight of the carrier. For the coupons at 40 degrees Celsius, the rate of corrosion may increase slightly at an amount of charged H-CNC of 0.7% by weight of the carrier from a corrosion rate of about 0.48 to 0.53 mpy at an amount of charged H-CNC of 1.0% by weight of the carrier. According to a further preferred aspect, the amount of charged H-CNC in the composition may thus be equal to 0.2 to 0.7% by weight of the carrier.

The corrosion rate for the coupons at 40 degrees Celsius appears to be at its lowest at an amount of charged H-CNC of about 0.6% by weight of the carrier, which also corresponds to a low corrosion rate for the coupons at 25 degrees Celsius: the corrosion rate of the coupon at 40 degrees Celsius would appear to equal to about 0.40 mpy and the corrosion rate of the coupon at 25 degrees Celsius would appear to equal to about 0.33 mpy. According to a yet further preferred aspect, the amount of cellulose nanocrystals in the composition may thus generally be equal to 0.6% by weight of the carrier.

Referring to Table 3, additional averaged test results for coupons subjected to a temperature of 5 degrees Celsius show that corrosion rates may lower from 1.54 mpy to 0.76 mpy when 1% of charged H-CNC by weight of the carrier is added and the steel is subject to a corrosive environment in this example in the form of a typical seawater solution. This change amounts to a corrosion rate drop of about 51%.

Further averaged test results for coupons subjected to a temperature of 70 degrees Celsius show that corrosion rates may lower from 2.26 mpy to 1.43 mpy when 1% of charged H-CNC by weight of the carrier is added and the steel is subject to a corrosion environment in this example in the form of a typical seawater solution. This change amounts to a corrosion rate drop of about 37%.

Also shown in Table 3 are corrosion test results of ferrous metal in the form of P110 grade steel coupons positioned within an autoclave at a pressure of over 50 psig, in which the coupons were submerged in an aqueous solution in a corrosive environment comprising 15% HCl and 0 and 0.5% of charged H-CNC as a percent by weight of the carrier, respectively, at a temperature of about 150 degrees Celsius. The test results show that corrosion rates may lower from 0.81 lb/ft$^2$ to 0.70 lb/ft$^2$ when 0.5% of charged H-CNC by weight of the carrier is added. This change amounts to a corrosion rate drop of about 14%.

The results of table 3 thus evidence that charged cellulose nanocrystals having ester groups thereon, when dispersed in an effective corrosion inhibiting amount within a composition comprising a carrier essentially consisting of water may be configured to inhibit corrosion of a metal object such as steel subjected to a corrosive environment by 8% or more. In the table of results set out table 3, this conclusion is supported for a temperature range of 5 degrees Celsius to at least 150 degrees Celsius. One may infer based on these test results that compositions having a percentage of charged H-CNC at least somewhere within the range of 0 to 1% of charged H-CNC by weight of the carrier inhibit corrosion of ferrous metals subject to a corrosive environment by at least 8% or more for temperature and pressure conditions that enable the composition to remain in liquid form.

Cellulose nanocrystals (CNC) may be non-toxic, as shown in the "Nanocrystalline Cellulose Material Safety Data Sheet", prepared by FP Innovations on Oct. 31, 2011, and revised on Apr. 16, 2012. Cellulose nanocrystals arise from plant material such as wood, and thus charged H-CNC as set out above may comprise a corrosion inhibitor that is environmentally friendly and biodegradable.

Example 4

In this example corrosion rates were obtained by immersing coupons of a ferrous metal, in this example steel in the form of carbon steel 4130, in typical seawater compositions. The testing conditions and means for determining corrosion rates were otherwise similar to Example 3. A first set of jars had added thereto amounts of charged H-CNC of 0, 0.1, 0.2, 0.5 and 0.875 as a percent by weight of the carrier. A second set of jars had added thereto amounts of oxidized charged H-CNC of 0, 0.1, 0.2, 0.5 and 0.875 as a percent by weight of the carrier. The charged H-CNC was oxidized so as to remove the aldehyde end groups that may otherwise be present on H-CNC. The results of the testing are set out in Table 2 below.

TABLE 4

| Steel Corrosion Rates (mpy) at 25° C. | | | | | |
|---|---|---|---|---|---|
| | Additional Inhibitor (wt. %) | | | | |
| | 0 | 0.1 | 0.2 | 0.5 | 0.875 |
| Charged H—CNC | 2.2 | 2.1 | 1.6 | 0.8 | 1.0 |
| Oxidized charged H—CNC | 2.2 | 1.4 | 1.8 | 1.0 | 1.1 |

Figure 2:
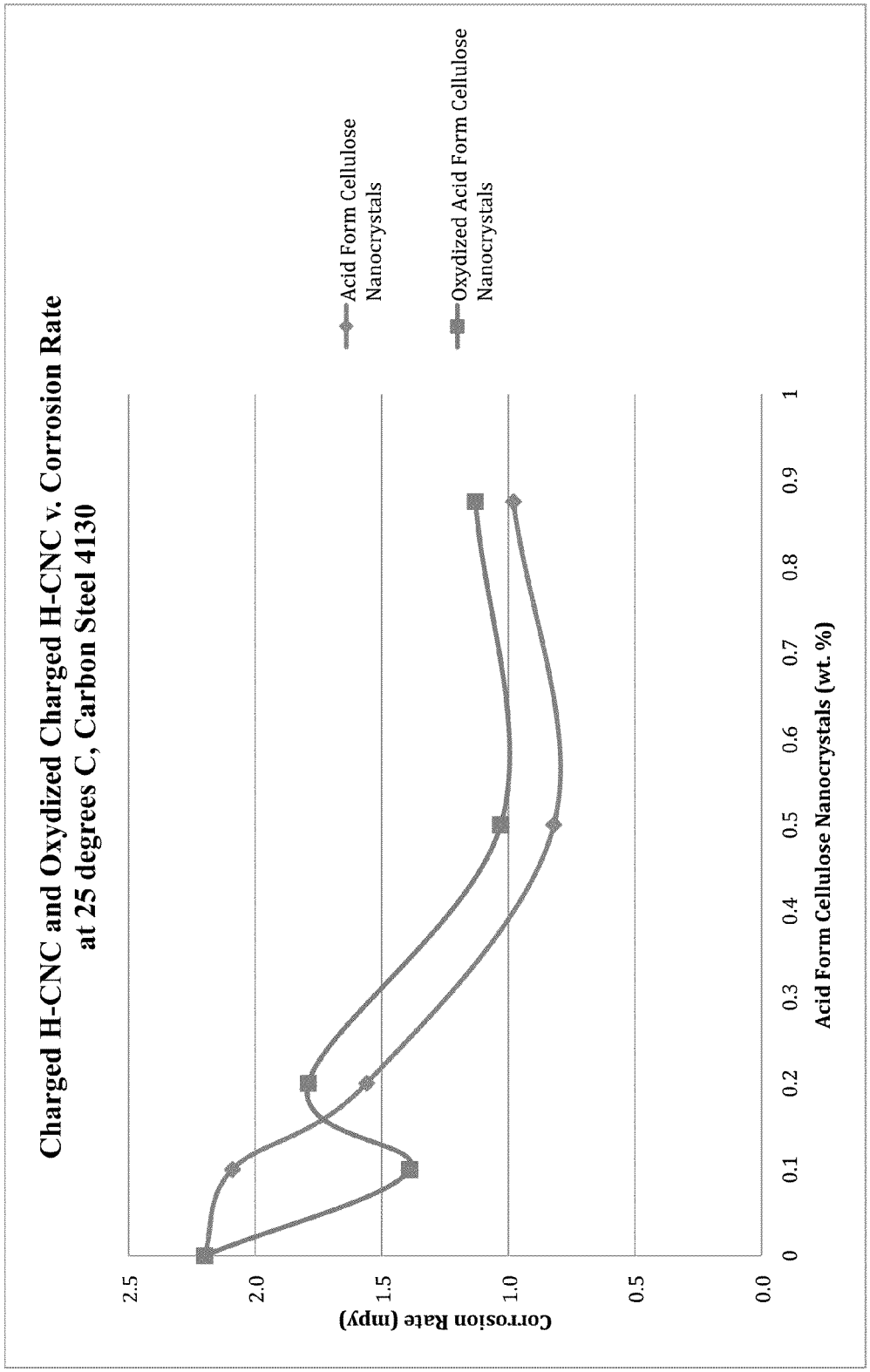
FIG. 2 is a line graph showing the results of another coupon jar test similar to FIG. 1 for carbon steel 4130 in which charged H-CNC and oxidized charged H-CNC, respectively, were added in varying amounts to sea-salt solutions and tested at a temperature of 25 degrees Celsius.

The above set out results, also shown in the graph of FIG. 2, evidence that both non-oxidized and oxidized charged H-CNC function to inhibit corrosion of ferrous metal when the metal is exposed to a corrosive environment. The results thus evidence that charged H-CNC may be effective at inhibiting corrosion of metals in corrosion environments regardless of the presence or absence of aldehyde end groups coupled to the H-CNC.

Example 5

In this example corrosion rates were obtained by immersing coupons of carbon steel 4130 in typical seawater compositions. The testing conditions and means for determining corrosion rates were otherwise similar to Example 3. A first set of jars had added thereto amounts of charged H-CNC of 0, 0.1, 0.2, 0.5, 0.75 and 1.0 as a percent by weight of the carrier. The charged H-CNC was obtained via acid hydrolysis using sulfuric acid and thus included negatively charged sulfate ester groups on surfaces thereof.

A second set of jars had added thereto amounts of phosphated charged H-CNC of 0, 0.1, 0.2, 0.5, 0.75 and 1.0 as a percent by weight of the carrier. The phosphated charged H-CNC was obtained from a stock of Na-CNC that was re-dispersed using phosphoric acid. Phosphated charged H-CNC may thus include phosphate ester groups thereon.

TABLE 5

| Steel Corrosion Rates (mpy) at 25° C. | | | | | | |
|---|---|---|---|---|---|---|
| Additional Inhibitor | 0 | 0.1 | 0.2 | 0.5 | 0.75 | 1 |
| Charged H—CNC (sulfate ester groups) | 2.38 | 2.16 | 1.12 | 1.50 | 0.71 | 0.74 |
| Phosphated charged H—CNC (phosphate ester groups) | 2.56 | 1.93 | 1.41 | 0.76 | 0.64 | 0.56 |

Figure 3:
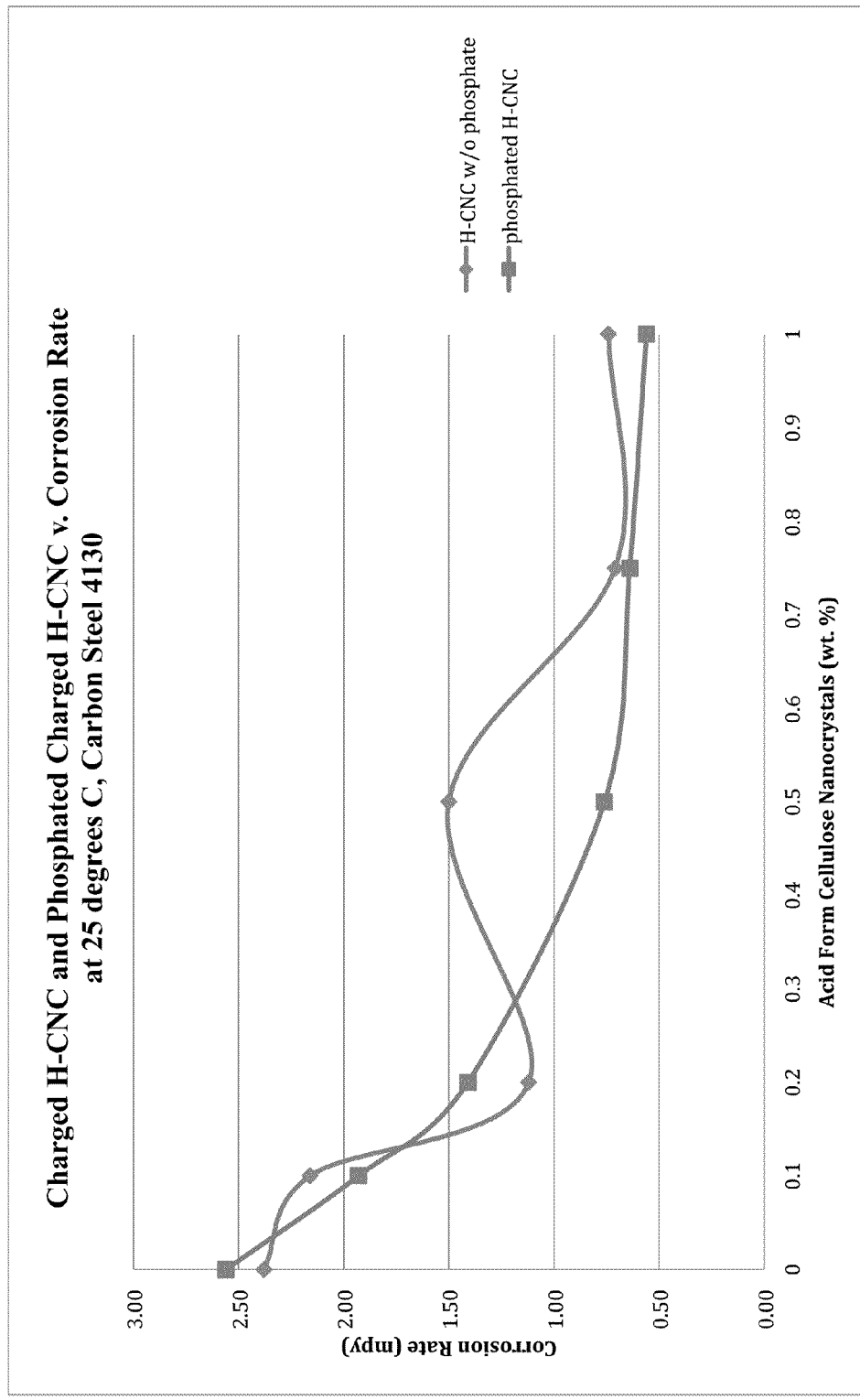
FIG. 3 is a line graph showing the results of a further coupon jar test similar to FIG. 1 for carbon steel 4130 in which charged H-CNC (sulfate ester groups) and phosphated charged H-CNC (phosphate ester groups), respectively, were added in varying amounts to sea-salt solutions and tested at a temperature of 25 degrees Celsius.

The above set out results, also shown in the graph of FIG. 3, may evidence that both H-CNC with negatively charged sulfate ester groups on the surfaces thereof and H-CNC with negatively charged phosphate ester groups on the surfaces thereof function to inhibit corrosion of ferrous metal when the metal is exposed to a corrosive environment. From this one may infer that H-CNC with negatively charged ester groups per se on the surfaces thereof function to inhibit corrosion of ferrous metal when the metal is exposed to a corrosive environment.

For example, one may infer from the above that H-CNC extracted from acid hydrolysis via carboxylic acid, and thus H-CNC with negatively charged carboxylic ester groups on the surfaces thereof, would also function to inhibit corrosion of ferrous metal when the metal is exposed to a corrosive environment.

1.2 Non-Ferrous Metals and Charged Cellulose Nanocrystals

Cellulose nanocrystals in charged, acid-form are also effective in inhibiting the corrosion of aluminium and the like, while not appearing to be effective for copper alloys, in this example brass. Exemplary sets of results in this regard are shown in Examples 6 and 7 set out below.

Example 6

Corrosion rates were obtained by immersing coupons of aluminium, in this example aluminium 2024-T3 within saltwater solutions. The testing and means of determining corrosion were similar to Example 3. The coupons in this case were tested at approximately 35 degrees Celsius, with jars having respective amounts of 0, 0.1, 0.2, 0.5, 1.0, and 2.0% of charged H-CNC as a percent by weight of the water. Each jar included a corrosive environment in the form of a typical seawater environment: 28.8 grams of sea salt (3.6% by weight of the carrier) were added per jar. The coupons were fully submerged within this solution. The results of the testing are set out in Table 6 below.

TABLE 6

| Aluminum Corrosion Rates at 35° C. (mpy) | | | | | | |
|---|---|---|---|---|---|---|
| Charged H—CNC in weight % | 0 | 0.1 | 0.2 | 0.5 | 1 | 2 |
| Corrosion rate (mpy) | 0.84 | 0.86 | 0.52 | 0.11 | 0.15 | 0.24 |

As seen above, the corrosion rate for the aluminium coupons was found to decrease from 0.84 mpy to 0.11 mpy when the amount of charged H-CNC was increased from 0 to 0.5% by weight of the carrier. Similar to the effects discovered for ferrous metals, these results thus point to the conclusion that charged H-CNC added in an effective amount may also function to inhibit corrosion of aluminium-based metals subjected to a corrosive environment.

The test results evidence that corrosion rates may lower from 0.84 mpy to 0.11 mpy when 0.5% of charged H-CNC by weight of the carrier is added and the aluminium is subject to a corrosion environment in this example in the form of a typical seawater solution. This change amounts to a corrosion rate drop of about 87%. The test results evidence that corrosion rates may lower from 0.84 mpy to 0.24 mpy when 2.0% of charged H-CNC by weight of the carrier is added and the aluminium is subject to a corrosion environment in this example in the form of a typical seawater solution. This change amounts to a corrosion rate drop of about 71%.

One may infer based on these test results that compositions having a percentage of charged H-CNC at least somewhere within the range of 0.2 to 2.0% of charged H-CNC by weight of the carrier inhibit corrosion of aluminium-based metals subjected to corrosive environments by 38% or more for temperature and pressure conditions that enable the composition to remain in liquid form.

Example 7

Further testing was performed in conditions similar to those set out in Example 6 for brass, in this example in the form of UNS C27000 yellow brass coupons. Corrosion rates were found to increase from 0.15 mpy to 0.26 mpy when the amount of charged H-CNC was increased from 0 to 0.5% by weight of the carrier, implying that charged H-CNC may not be effective for inhibiting corrosion of copper alloys and the like.

2. Corrosion Inhibitors and Charged Cellulose Nanocrystals

It has been found that cellulose nanocrystals in charged, acid-form are particularly effective in combination with known corrosion inhibitors for inhibiting the corrosion of ferrous metals such as steels. This is demonstrated in Example 8, which includes Tables 7 to 9 and FIGS. 5 to 17. The corrosion inhibitors that follow are by way of example only, and other corrosion inhibitors may similarly be used to demonstrate the effects set out below.

Example 8

Corrosion rates were measured by immersing various coupons of steel (carbon steel 4130) in typical seawater compositions similar to that set out in example 3. The various sets of jars included charged H-CNC in amounts of 0, 0.1, 0.2, 0.5 and/or 1.0% by weight of the carrier. Various off-the-shelf corrosion inhibitors were then added in varying amounts as percentage by weight of the carrier to selective ones of the jars. The compositions were stirred together and then set aside for a minimum of twenty-four hours before starting the testing, which involved suspending the steel coupons in the jars. The compositions set out in Tables 7 and 8 and FIGS. 3 to 12 were tested at a temperature of 25 degrees Celsius and those set out in Table 9 and FIGS. 13 to 17 were tested at a temperature of 50 degrees Celsius.

TABLE 7

Steel Corrosion Rate (mpy) at 25° C.

| Additional Inhibitor | H—CNC (wt. %) | | | | |
|---|---|---|---|---|---|
|  | 0 | 0.1 | 0.2 | 0.5 | 1 |
| None | 1.60 | 1.47 | 0.61 | 0.35 | 0.33 |
| Ammonium Benzoate 0.1% | 1.77 | 0.58 | 0.57 | 0.44 | 0.67 |
| Ammonium Benzoate 0.2% | 2.04 | 0.45 | 0.72 | 0.44 | 0.83 |
| Ammonium Benzoate 0.5% | 2.06 | 1.08 | 1.29 | 0.70 | 0.71 |
| Benzotriazole (BTA) 0.1% | 0.70 | 0.65 | 0.35 | 0.24 | 0.22 |
| Benzotriazole (BTA) 0.2% | 0.46 | 0.36 | 0.00 | 0.02 | 0.19 |
| Benzotriazole (BTA) 0.5% | 0.23 | 0.37 | 0.28 | 0.02 | 0.20 |
| Cobratec ™ 928 0.1% | 1.35 | 1.33 | 0.85 | 0.23 | — |
| Cobratec ™ 928 0.2% | 1.37 | 0.35 | 0.84 | 0.28 | — |
| Cobratec ™ 928 0.5% | 0.86 | 0.56 | 0.52 | 0.26 | — |

TABLE 7-continued

Steel Corrosion Rate (mpy) at 25° C.

| Additional Inhibitor | H—CNC (wt. %) | | | | |
|---|---|---|---|---|---|
|  | 0 | 0.1 | 0.2 | 0.5 | 1 |
| Crodazoline ™ T 0.1% | 1.40 | 1.24 | 0.27 | 0.35 | — |
| Crodazoline ™ T 0.2% | 0.62 | 0.36 | 0.22 | 0.23 | — |
| Crodazoline ™ T 0.5% | 0.99 | 0.17 | 0.16 | 0.19 | — |
| 2-mercaptobenzothiazole (MBT) 0.1% | 1.38 | 1.47 | 1.08 | 0 | — |
| 2-mercaptobenzothiazole (MBT) 0.2% | 1.42 | 1.15 | 1.31 | 0.51 | — |
| 2-mercaptobenzothiazole (MBT) 0.5% | 1.34 | 1.43 | 1.44 | 0.37 | — |
| M-370 ™ 0.1% | 0.80 | 0.90 | 0.89 | 0.15 | — |
| M-370 ™ 0.2% | 0.56 | 0.68 | 0.83 | 0.27 | — |
| M-370 ™ 0.5% | 0.85 | 0.26 | 0.62 | 0.04 | — |
| VpCI 644 ™ 0.1% | 1.56 | 1.20 | 1.06 | 0.35 | 0.30 |
| VpCI 644 ™ 0.2% | 1.51 | 1.20 | 0.92 | 0.41 | 0.38 |
| VpCI 644 ™ 0.5% | 1.34 | 1.25 | 1.10 | 0.35 | 0.00 |

TABLE 8

Steel Corrosion Rate (mpy) at 25° C.

| Additional Inhibitor | H—CNC (wt. %) | | | | |
|---|---|---|---|---|---|
|  | 0 | 0.05 | 0.1 | 0.2 | 0.5 |
| None | 1.85 | 1.73 | 1.80 | 1.55 | 0.56 |
| Petro 22 ™ 0.01% | 1.58 | 1.57 | 1.38 | 1.13 | 0.84 |
| Petro 22 ™ 0.025% | 1.58 | 1.47 | 1.55 | 1.40 | 1.02 |
| Petro 22 ™ 0.0625% | 1.57 | 1.55 | 1.44 | 1.47 | 1.24 |

TABLE 9

Steel Corrosion Rate (mpy) at 50° C.

| Additional Inhibitor | H—CNC (wt. %) | | | | |
|---|---|---|---|---|---|
|  | 0 | 0.1 | 0.2 | 0.5 | 1 |
| None | 3.67 | 3.33 | 3.10 | 3.90 | — |
| Amine O ™ 0.1% | 2.62 | 2.49 | 2.71 | 1.58 | — |
| Amine O ™ 0.2% | 2.34 | 1.68 | 0.75 | 1.39 | — |
| Amine O ™ 0.5% | 2.28 | 3.02 | 1.97 | 0.54 | — |
| Amine O ™ 1% | 0.90 | 1.01 | 0.88 | 0.16 | — |
| Ammonium Benzoate 1% | 6.01 | 1.31 | 2.47 | 1.92 | — |
| Ammonium Benzoate 2% | 5.41 | 4.03 | 2.91 | 2.02 | — |
| Ammonium Benzoate 5% | 3.53 | 1.96 | 1.94 | 1.40 | — |
| Cobratec ™ AL 250 0.5% | 1.75 | — | 0.64 | — | — |
| Irgacor ™ L-190 0.1% | 3.71 | 2.33 | 2.61 | 0.89 | — |
| Irgacor ™ L-190 0.2% | 2.87 | 2.79 | 2.06 | 4.03 | — |
| Irgacor ™ L-190 0.5% | 3.52 | 3.86 | 4.61 | 1.24 | — |
| Irgacor ™ L-190 1% | 2.81 | 3.13 | 2.48 | 1.18 | — |
| Protecsol ™ 0.1% | 4.36 | 1.45 | 2.73 | 2.32 | — |
| Protecsol ™ 0.2% | 2.50 | 2.99 | 1.49 | 1.35 | — |
| Protecsol ™ 0.5% | 2.48 | 2.41 | 2.32 | 0.41 | — |
| 2-mercaptobenzothiazole (MBT) 0.1% | 3.99 | — | — | 0.71 | — |
| M-320 ™ 0.5% | 2.25 | 1.51 | 1.50 | 0.52 | — |
| M-320 ™ 2% | 1.66 | 1.31 | 0.51 | 0.62 | — |
| M-370 ™ 0.1% | 3.79 | — | — | 1.22 | — |
| M-370 ™ 0.5% | 2.76 | — | — | 1.07 | — |

Figure 5:
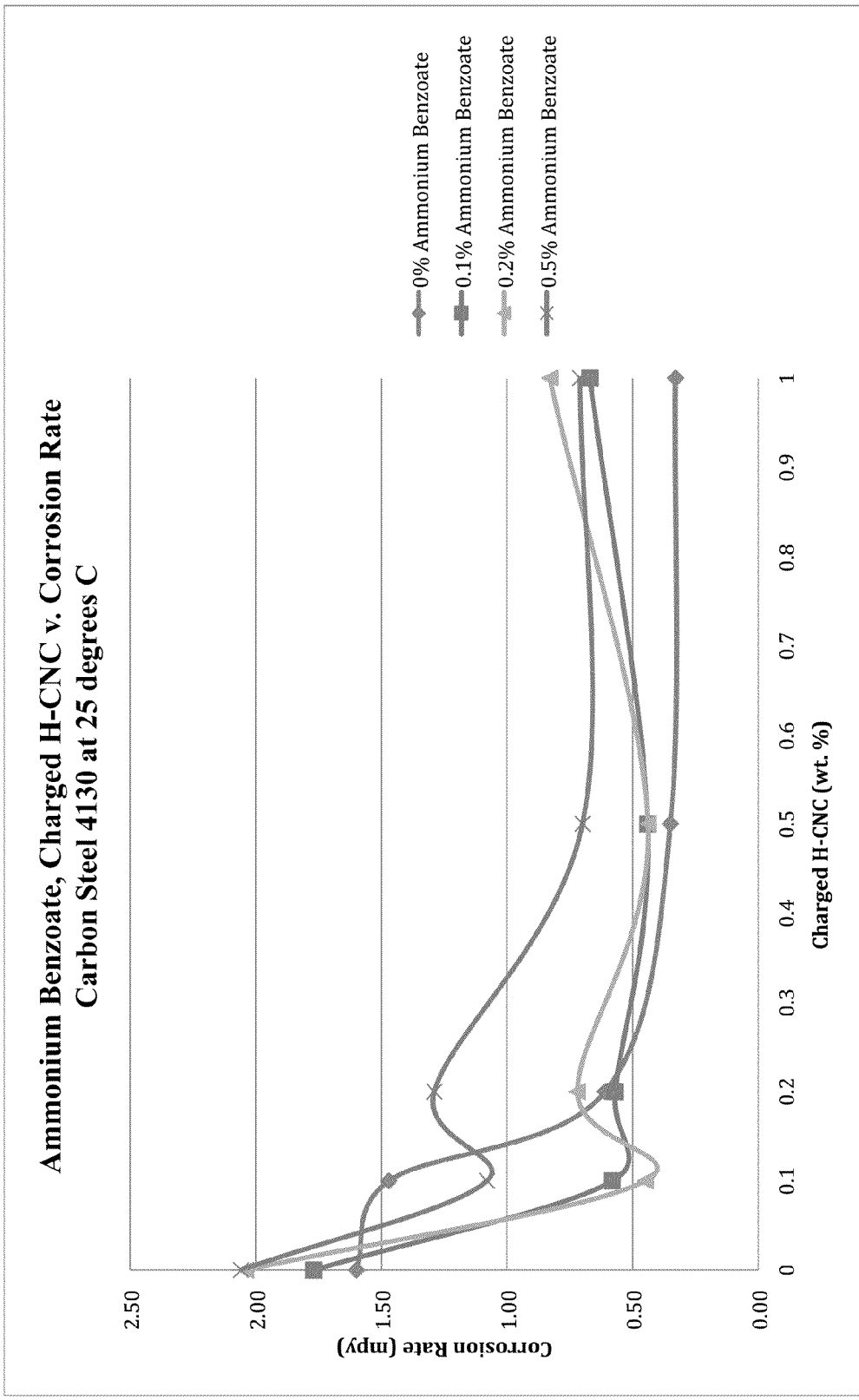
FIG. 5 is a line graph showing the results of yet another coupon jar test similar to FIG. 1 in which steel coupons were tested at 25 degrees Celsius with various amounts of ammonium benzoate and charged H-CNC added to the jars.
Figure 14:
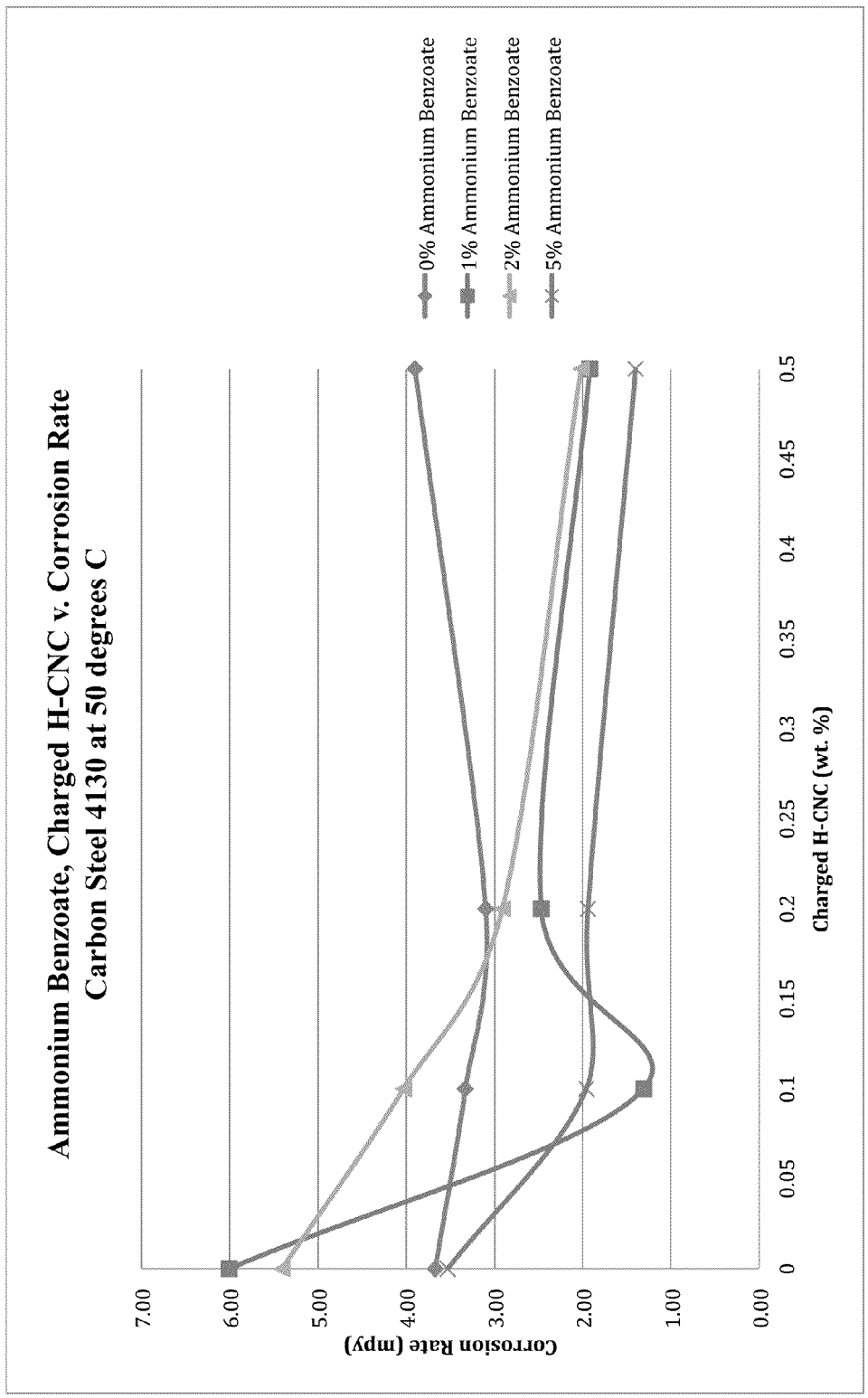
FIG. 14 is a line graph showing the results of another coupon jar test similar to FIG. 1 in which steel coupons were tested at 50 degrees Celsius with various amounts of ammonium benzoate and charged H-CNC added to the jars.

As seen in Table 7 and FIGS. 5 and 14, one of the tested compounds was ammonium benzoate. Ammonium benzoate is an example of an aqueous, biodegradable corrosion inhibitor for ferrous metals or aluminium of the type that may be adapted for oil and gas industry applications, for example. It has a CAS number of CAS 1863-63-4. Ammonium benzoate is an off-the-shelf product that may be readily obtained from a variety of chemical supply companies, as would be appreciated by one skilled in the art.

Referring to Table 7 and the graph of FIG. 5, the results demonstrate that the corrosion rate of steel generally decreases for compositions including ammonium benzoate, as the percent of charged H-CNC within the various compositions of the jars increases from an amount of 0 to 1.0% by weight of the carrier. According to one aspect, the results demonstrate that the effective amount of charged H-CNC in the composition is thus preferably equal to or less than 1% by weight of the carrier for ammonium benzoate.

The results evidence that charged cellulose nanocrystals having ester groups thereon, when dispersed in an effective corrosion inhibiting amount within a composition comprising a carrier essentially consisting of water and comprising ammonium benzoate, in which the H-CNC is an amount equal to or greater than 0.1% by weight of the carrier, may inhibit corrosion of a metal object such as steel subjected to a corrosive environment by 25% or more. This conclusion is supported for the range of ammonium benzoate of up to at least 5% by weight of the carrier. The carrier in the form of water may thus equal to or greater than 95% by weight of the composition.

The results show that the corrosion rate of the coupons significantly dips at rates much greater than the sum of the effect of charged H-CNC alone when as little as 0.1% by weight of charged H-CNC is added thereto. This thus evidences that a synergistic effect is occurring. Other enhanced effects are seen, for example, when as little as 0.5% by weight of charged H-CNC is added to compositions having ammonium benzoate at up to at least 5% by weight of the carrier. The corrosion-inhibiting composition may comprise charged H-CNC in an amount generally equal to 0.1 to 0.6% by weight of the carrier and ammonium benzoate in an amount generally equal to up to 5% by weight of the carrier.

Figure 6:
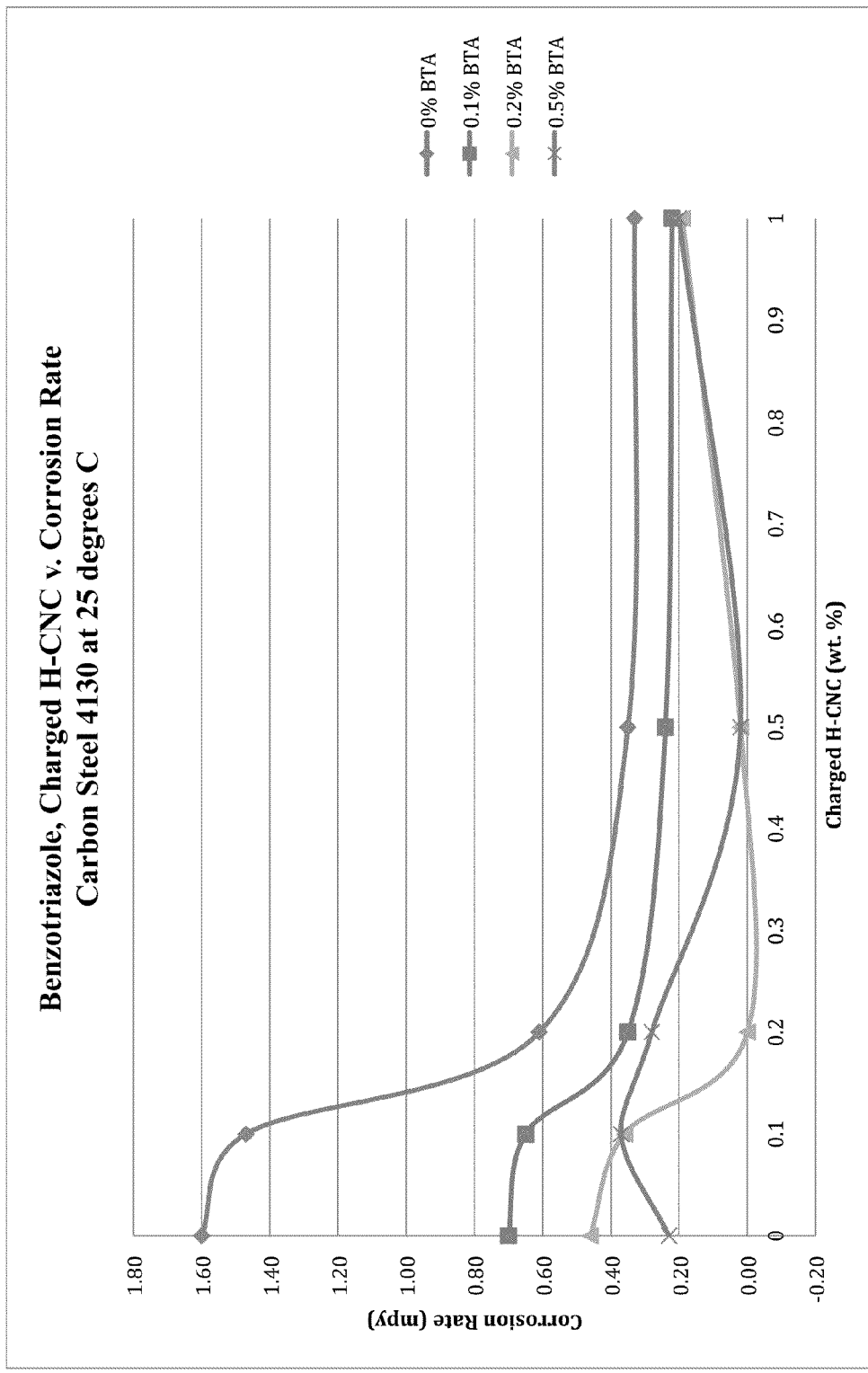
FIG. 6 is a line graph showing the results of yet a further coupon jar test similar to FIG. 1 in which steel coupons were tested at 25 degrees Celsius with various amounts of benzotriazole ("BTA") and charged H-CNC added to the jars.
Figure 9:
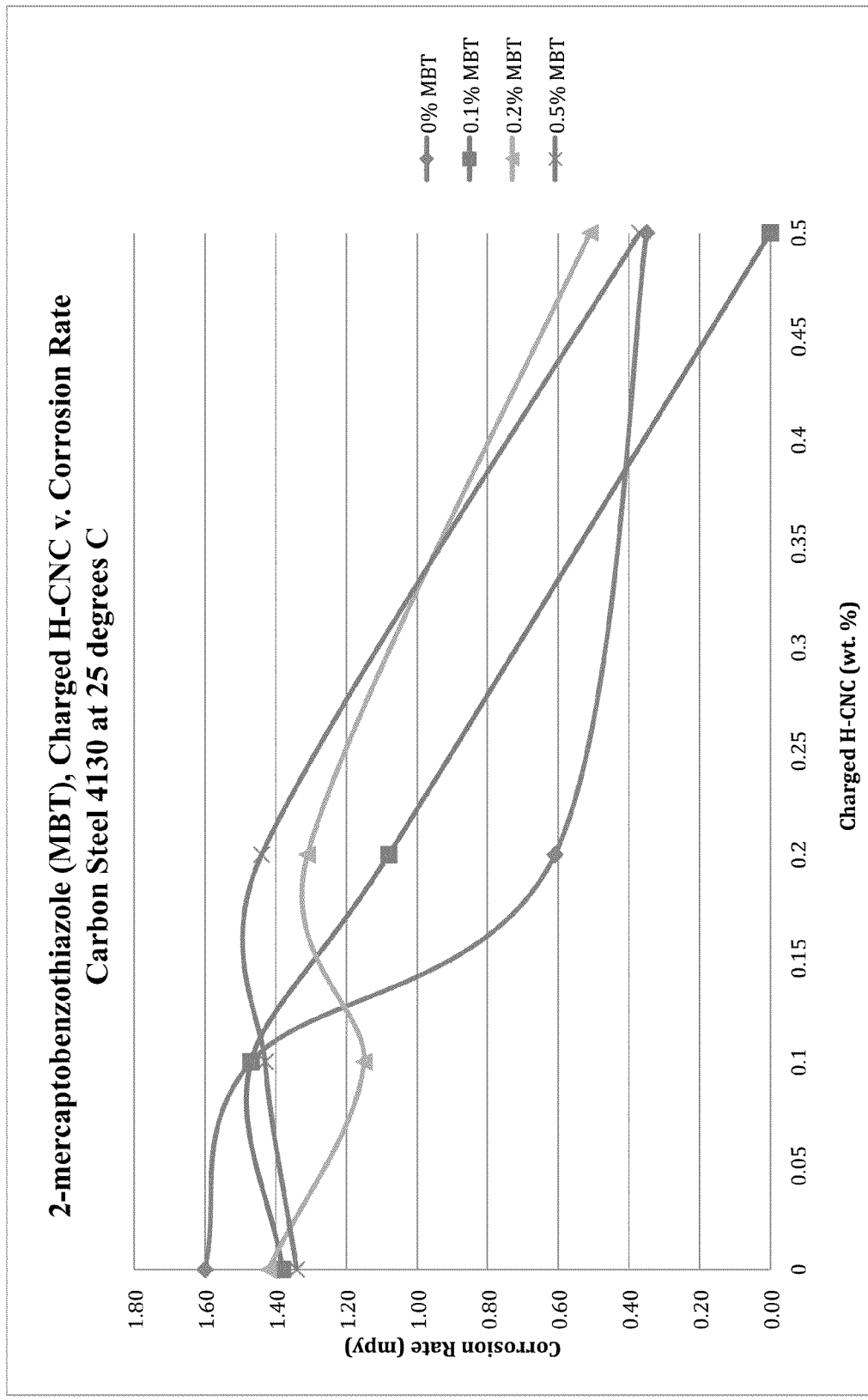
FIG. 9 is a line graph showing the results of a further coupon jar test similar to FIG. 1 in which steel coupons were tested at 25 degrees Celsius with various amounts of 2-mercaptobenzothiazole ("MBT") and charged H-CNC added to the jars.

As seen in Tables 7 and 9 and FIGS. 6 and 9, also tested were common azoles in the form of benzotriazole (BTA) and 2-mercaptobenzothiazole (MBT). BTA and MBT are widely used corrosion inhibitors for metals that include copper, brass, and bronze. BTA has a CAS number of CAS 95-14-7 and MBT has a CAS number of 149-30-30.

The results demonstrate that the corrosion rate of steel for the most part decreases for compositions that include BTA as the percentage of charged H-CNC within the various compositions of the jars increases from an amount of 0 to at least 0.5% by weight of the carrier. For BTA, the data supports the conclusion that corrosion is inhibited in cases where the BTA is in an amount of 0 to 0.5% by weight of the carrier and the cellulose nanocrystals are charged and in acid-form and included in an amount greater than 0.2% by weight of the carrier. The results show that the corrosion rate of the coupons significantly decreases or dips for each of the compositions within an amount of charged H-CNC in the range of 0 and 0.5% by weight of the carrier. For the compositions in which the BTA was in an amount of 0.2% by weight of the carrier, the corrosion rate decreased from 0.46 to 0.00 mpy as the amount of charged H-CNC increased from 0 to 0.2% by weight of the carrier. For the compositions in which the BTA was in an amount of 0.5% by weight of the carrier, the corrosion rate decreased from 0.23 to 0.02 mpy as the amount of charged H-CNC increased from 0 to 0.5% by weight of the carrier. For the compositions in which no BTA was added, the corrosion rate decreased from 1.60 to 0.35 mpy when the amount of charged H-CNC increased from 0 to 0.5% by weight of the carrier.

Figure 4:
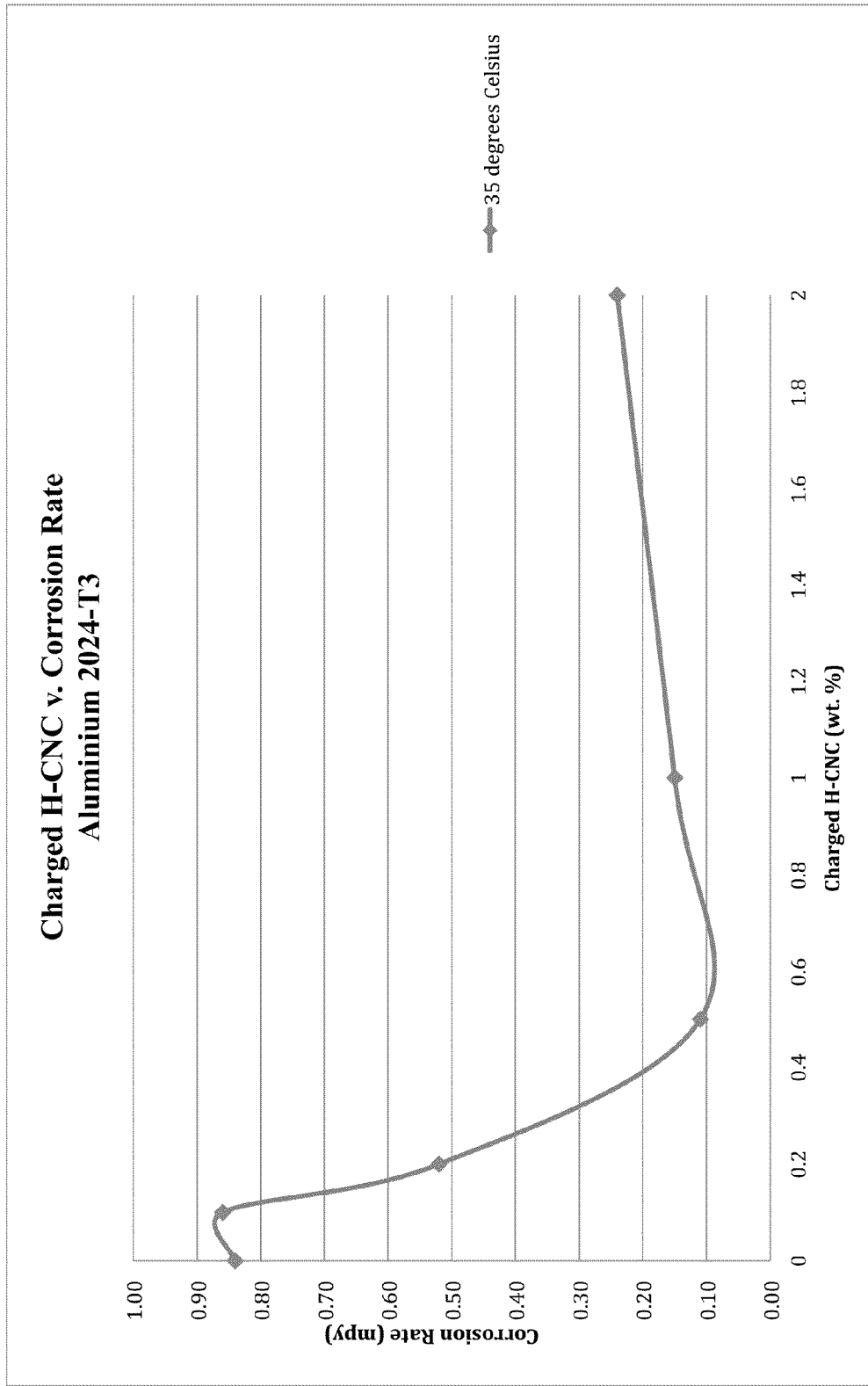
FIG. 4 is a line graph showing the results of an additional coupon jar test similar to FIG. 1 in which aluminium 2024-T3 coupons were added to the jars and tested at a temperature of 35 degrees Celsius.

These and other results from Table 7 and the graph of FIG. 6 demonstrate that an enhanced inhibition effect is occurring between charged H-CNC and BTA, in which the corrosion rate for a composition comprising both a given amount of charged H-CNC and a given amount of the BTA is typically less than any one of the individual corrosion rates that would occur from the given amounts of charged H-CNC and BTA, respectively, on their own. According to one preferred range, a corrosion-inhibiting composition may comprise charged, acid-form cellulose nanocrystals in an amount generally equal to 0.1 to 0.6% by weight of the carrier and azole in an amount that is less than 0.5% by weight of the carrier. FIG. 4 suggests that a corrosion-inhibiting composition comprising charged H-CNC included in an amount generally in the range of 0.2 to 0.5% by weight of the carrier and BTA included in an amount generally equal to 0.2% by weight of the carrier results in generally zero corrosion.

Tables 7 and 9 and FIG. 9 show that a corrosion inhibition composition comprising about MBT in an amount of about 0.1% by weight of the carrier and charged H-CNC in an amount of about 0.5% by weight of the carrier is particularly effective at inhibiting corrosion.

The above corrosion inhibition results for compositions comprising azole in the form of either BTA or MBT and charged, acid-form cellulose nanocrystals evidence that charged, acid-form cellulose nanocrystals in solution may also be effective at inhibiting corrosion when combined in effective amounts with other azoles, such as: syner1,2benzisothiazoline-3-1; 2-benzimidazolone; 4,5,6,7-tetrahydrobenzotrazole; tolylimidazolone; tolyltriazole; and 2(5-ethyl-2-pyridyl)benzimidazole, for example.

Figure 7:
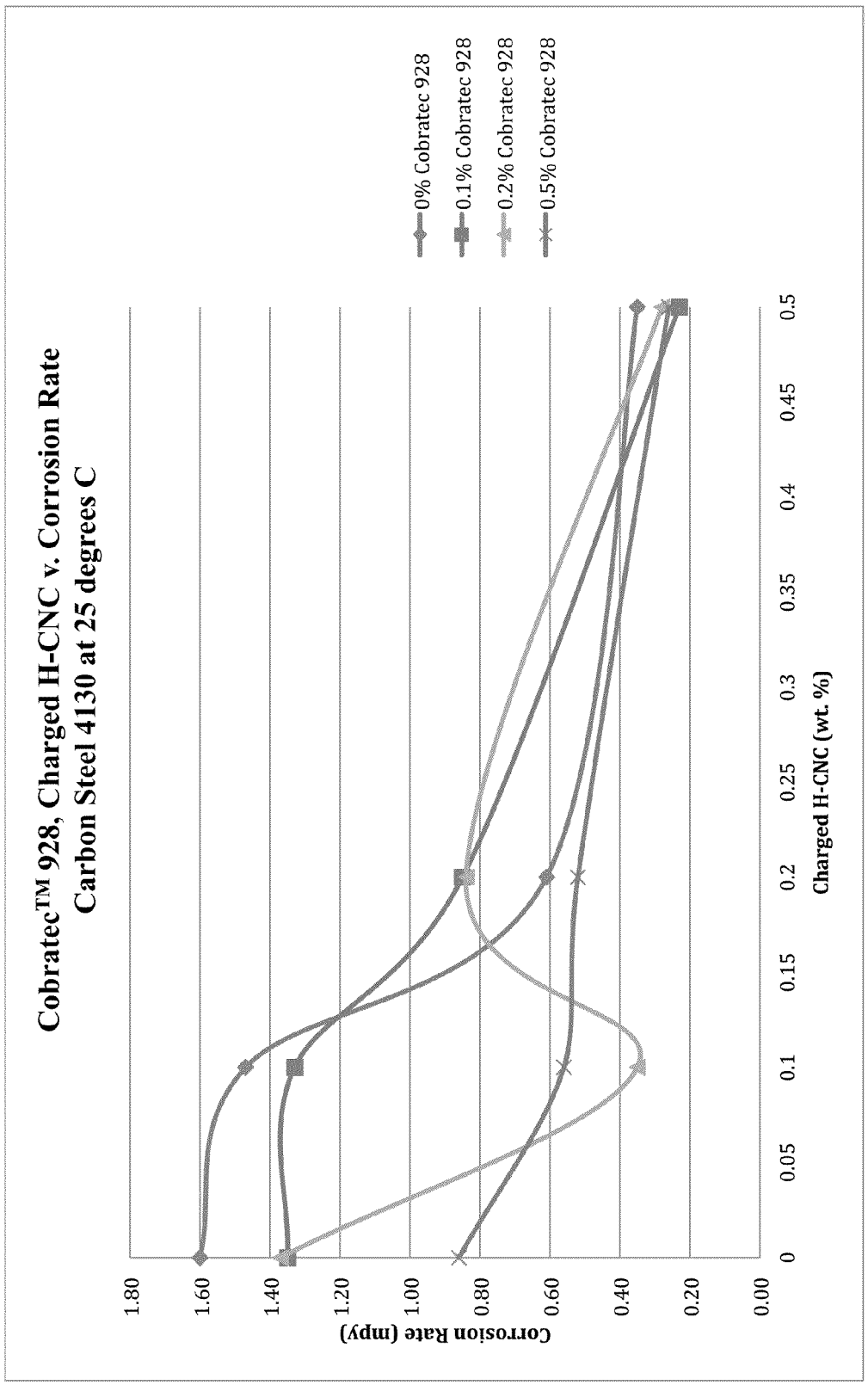
FIG. 7 is a line graph showing the results of yet an additional coupon jar test similar to FIG. 1 in which steel coupons were tested at 25 degrees Celsius with various amounts of proprietary inhibitor Cobratec™ 928 and charged H-CNC added to the jars.

As seen with reference to Tables 7 and 9 and FIG. 7, further testing of steel coupons was performed on a variety of proprietary corrosion inhibitors from Cobratec Metal Protection, including Cobratec™ AL 250 and 928. These inhibitors may be purchased at PMC Specialties Group, Inc., which has an address of 501 Murray Rd. Cincinnati, Ohio 45217. Cobratec™ AL-250 is traditionally an aluminium corrosion inhibitor that may further be useful in multi-metal systems that include copper, brass and steel. It contains ethanol, 2-(2-aminoethoxy)- and has a CAS number of 929-06-6. Cobratec™ 928 is also a multi-metal corrosion inhibitor for metal working fluids, fuels and air conditioning, for example.

FIG. 7 demonstrates that a corrosion inhibiting composition comprising a carrier, charged H-CNC at as little as 0.1% by weight of the carrier and Cobratec™ 928 in amounts of at least 0.2% by weight of the carrier result in an enhanced effect in corrosion inhibition, for example. Table 9 shows that a further enhanced effect occurs at a temperature of 50 degrees Celsius when the composition comprises charged H-CNC at 0.2% by weight of the carrier and Cobratec™ AL 250 at 0.5% by weight of the carrier.

Figure 10:
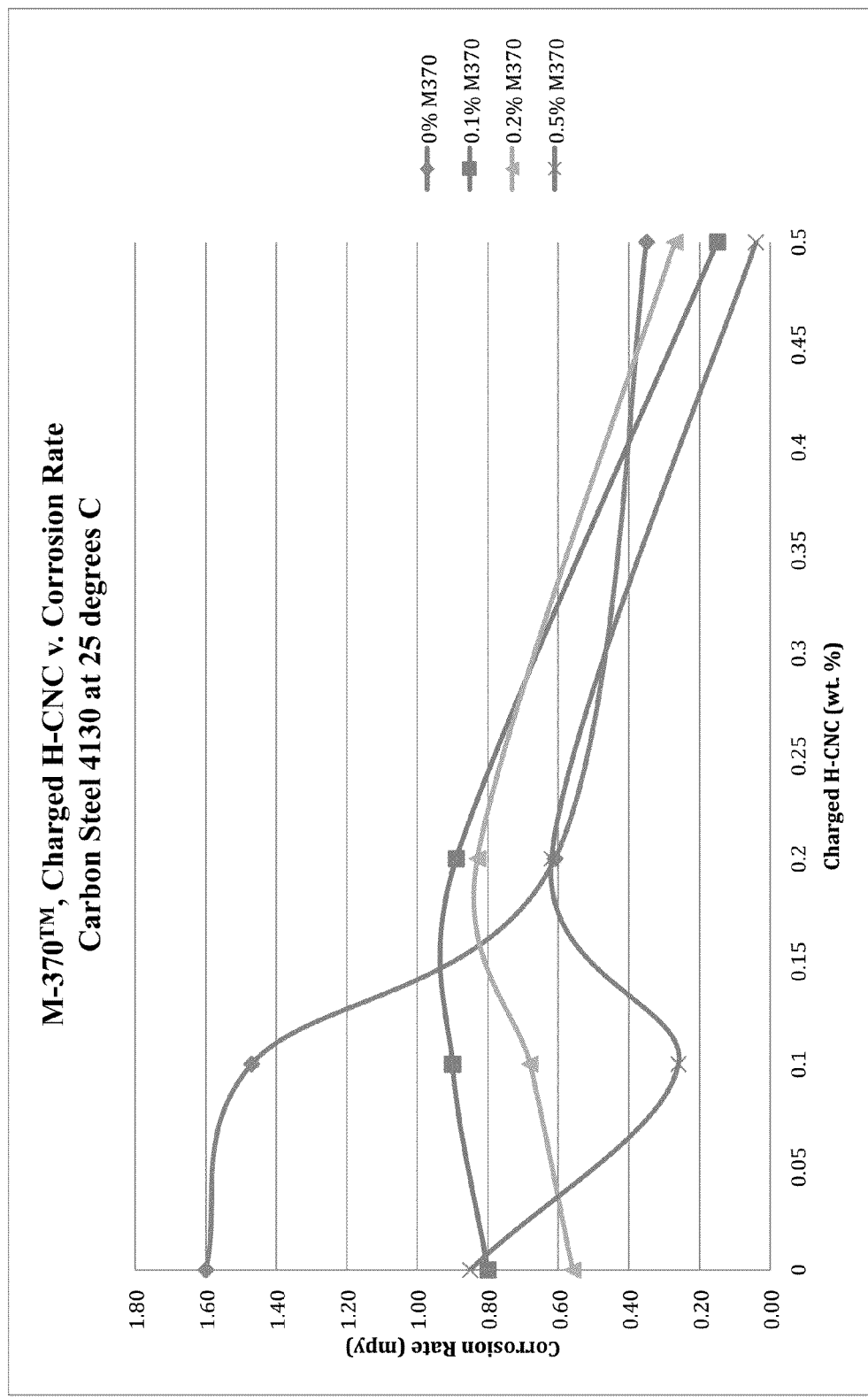
FIG. 10 is a line graph showing the results of an additional coupon jar test similar to FIG. 1 in which steel coupons were tested at 25 degrees Celsius with various amounts of proprietary inhibitor M-370™ and charged H-CNC added to the jars.
Figure 11:
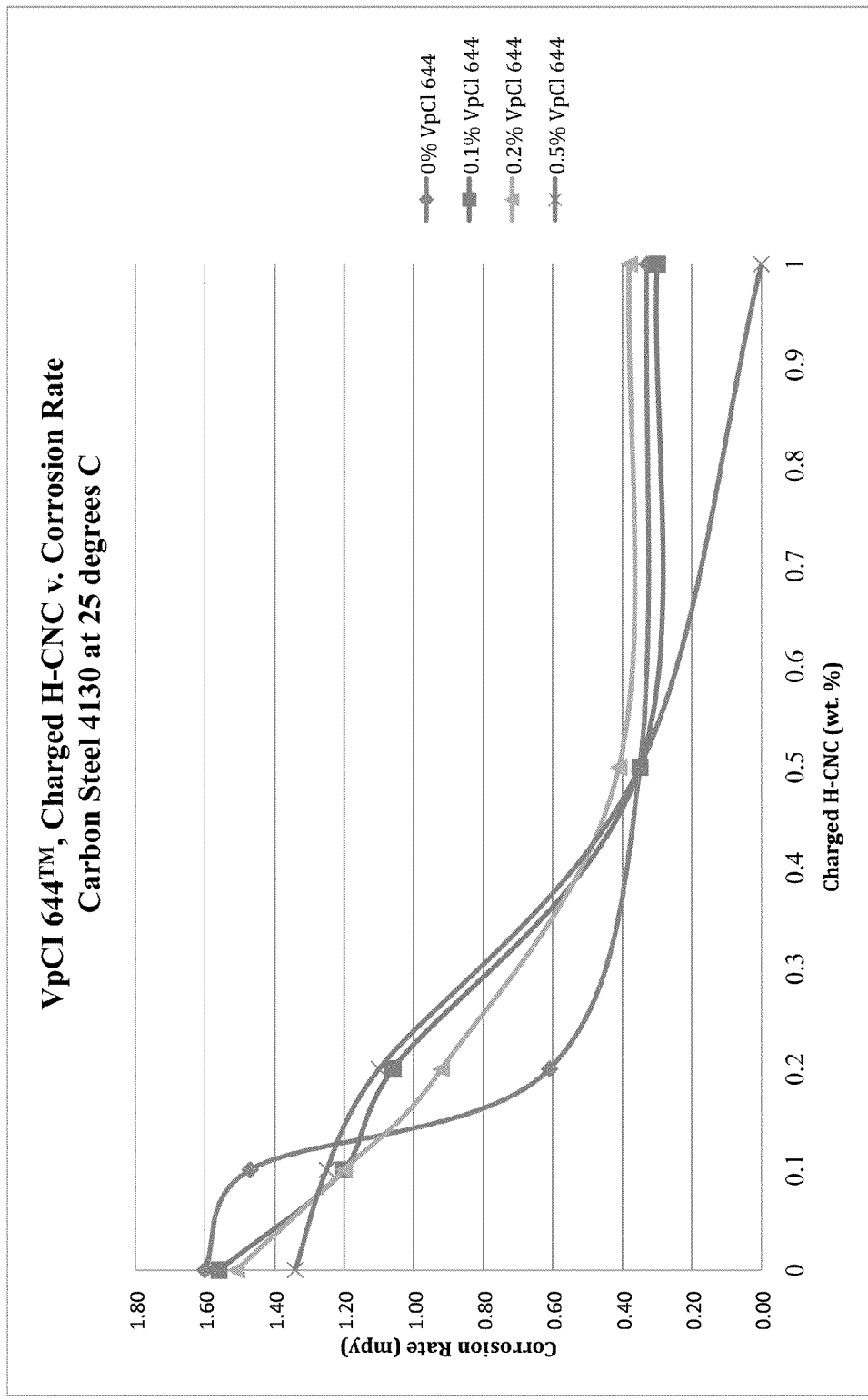
FIG. 11 is a line graph showing the results of yet another coupon jar test similar to FIG. 1 in which steel coupons were tested at 25 degrees Celsius with various amounts of proprietary inhibitor VpCI 644™ and charged H-CNC added to the jars.
Figure 17:
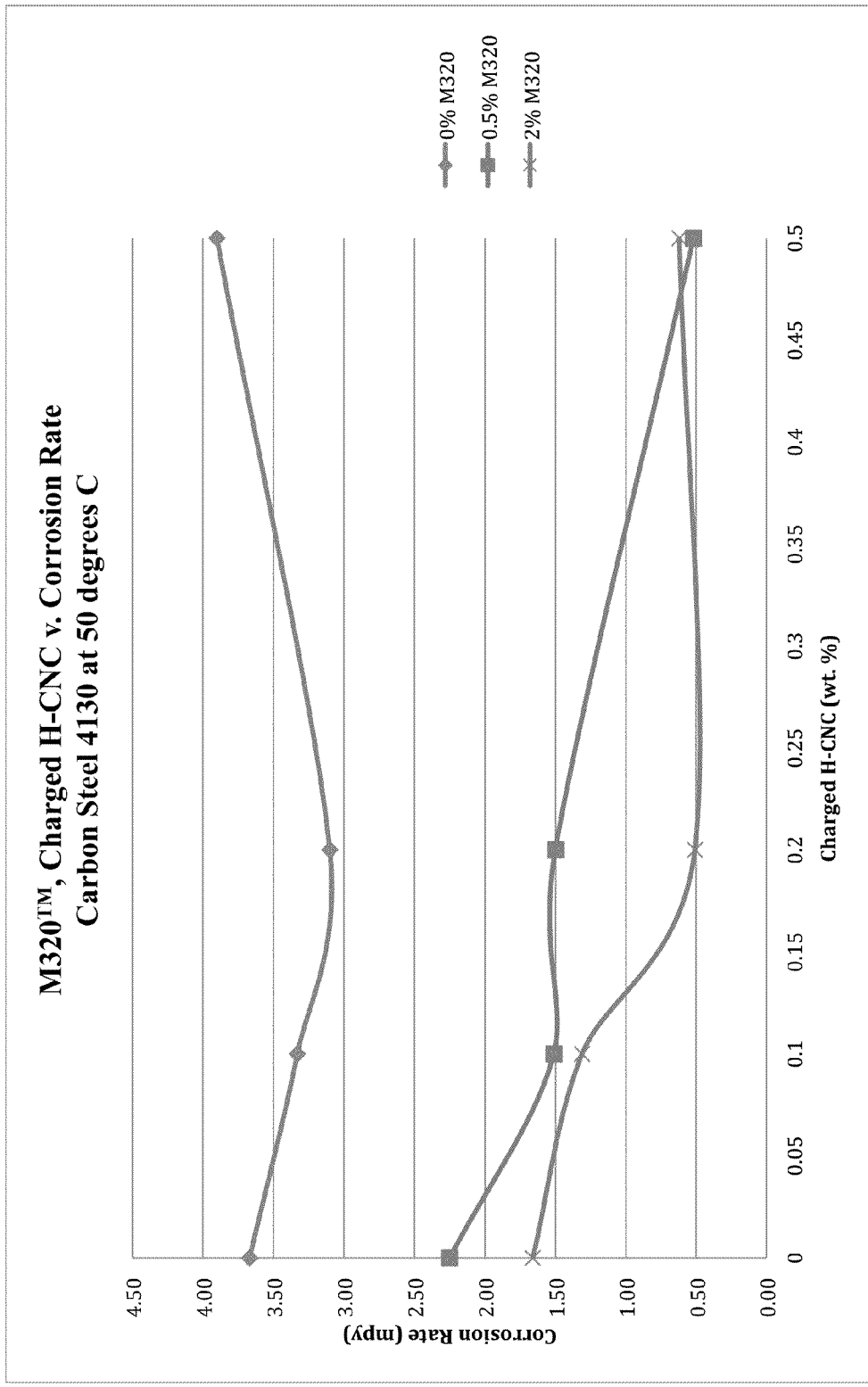
FIG. 17 is a line graph showing the results of yet another coupon jar test similar to FIG. 1 in which steel coupons were tested at 50 degrees Celsius with various amounts of proprietary inhibitor M-320™ and charged H-CNC added to the jars.

As seen in Tables 7 and 9 and FIGS. 10, 11 and 17, additional testing of steel coupons was performed on a variety of proprietary corrosion inhibitors from Cortec Corporation, including M-370™, VpCI 644™ and M-320™. These inhibitors may be purchased from Cortec Corporation, which has an address of 4119 White Bear Parkway, St. Paul, Minn. 55110, United States of America. M-370™ is a multi-metal protection additive for water-based metalworking fluids, lubricants, cleaners and coatings during product manufacturing. VpCI 644™ is an additive that may protect ferrous and non-ferrous metals from corrosion in fresh and salt water as well as brine. VpCI 644™ may be used for cooling and heating systems, as well as hydrotesting with seawater, for example. M-320™ is an additive for rust preventive, lubricating or hydraulic oils. M-320™ may be effect for both ferrous and non-ferrous metals.

As seen in Tables 7 and 9 and FIG. 10, enhanced corrosion inhibition effects have been found to occur, for example, when M-370™ is present in an amounts of between 0.1 to 0.5% by weight of the carrier and charged H-CNC is in an amount of 0.5% by weight of the carrier, for example, the effects being particularly shown at testing temperatures of 50 degrees Celsius. A significant dip in corrosion rates also was shown to occur when M-320™ was in an amount of 0.5% by weight of the carrier and charged H-CNC was in an amount of as little as 0.1% by weight of the carrier.

As seen in Table 7 and FIG. 11, the results demonstrate that the corrosion rate of steel decreases for compositions including the proprietary corrosion inhibitor VpCI 644™, as the percent of charged H-CNC within the various compositions of the jars increases from an amount of 0 to 1.0% by weight of the carrier. Enhanced corrosion inhibition effects are shown by FIG. 11 in which amounts of VpCI 644™ of up to 0.2% by weight of the carrier are combined with charged H-CNC in an amount of as little as 0.1% by weight of the carrier. The graph of FIG. 11 also shows an enhanced corrosion inhibition effect, for example, for a composition comprising VpCI 644™ in an amount of 0.5% by weight of the carrier and charged H-CNC in an amount of 1% by weight of the carrier, for example.

As seen in Table 9 and FIG. 17, enhanced corrosion inhibition effects have been found to occur, for example, when M-320™ is present in an amount of 0.5% by weight of the carrier and charged H-CNC is in an amount of 0.1 to 0.5% by weight of the carrier, for example, as well as when M-320™ is in an amount of 2% by weight of the carrier and charged H-CNC is in an amount of 0.2 to 0.5% by weight of the carrier.

Figure 12:
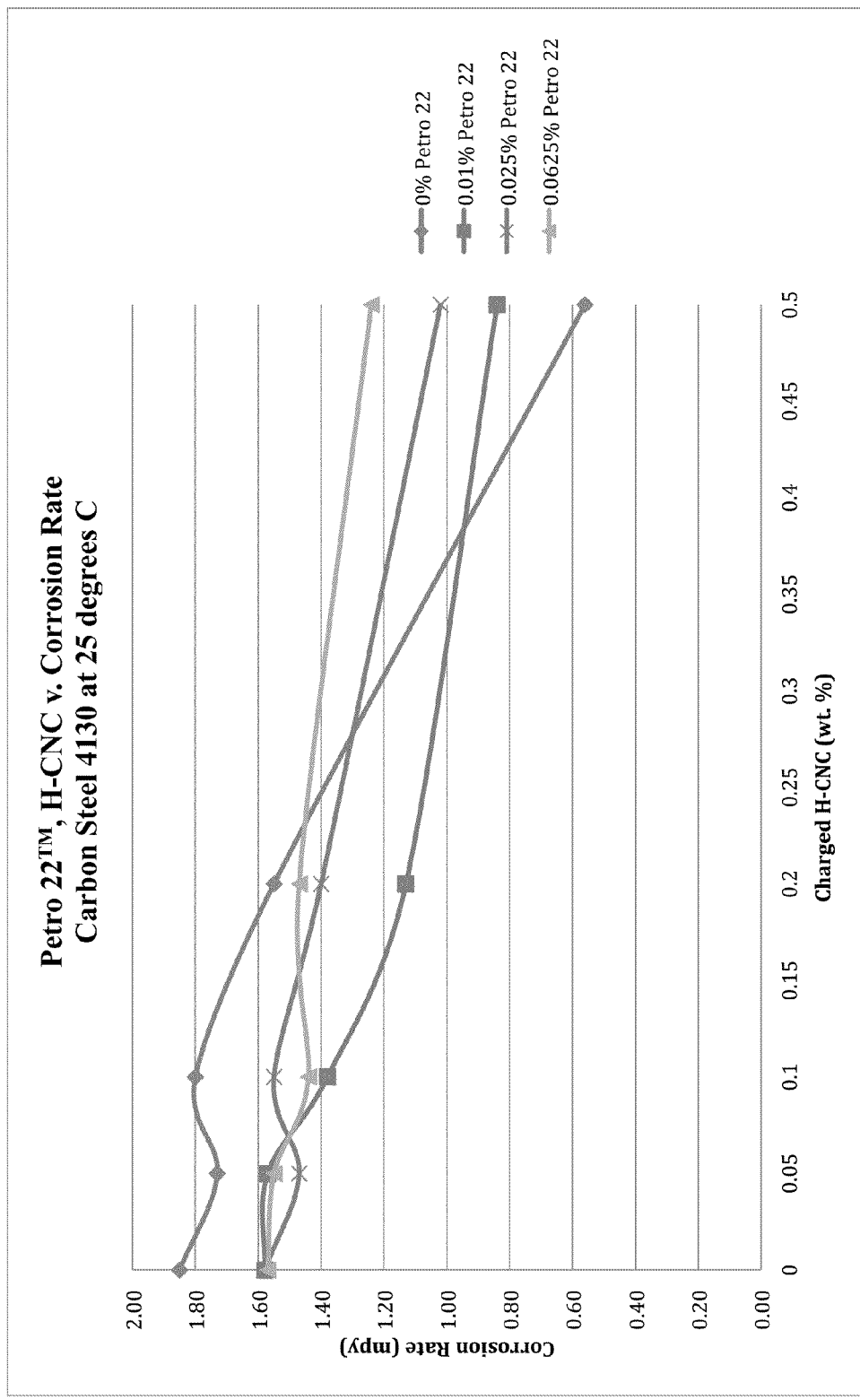
FIG. 12 is a line graph showing the results of yet a further coupon jar test similar to FIG. 1 in which steel coupons were tested at 25 degrees Celsius with various amounts of proprietary inhibitor Petro 22™ and charged H-CNC added to the jars.

As seen in Table 8 and FIG. 12, further testing of steel coupons was performed on a proprietary inhibitor from Akzo Nobel N.V. called Petro 22™, which is sold as a wetting agent. This compound may be purchased at Akzo Nobel N.V., having an address at Strawinskylaan 2555, Amsterdam, Netherlands. Petro 22™ may comprise sodium alkyl naphthalene sulfonate. Enhanced corrosion inhibition effects are shown in FIG. 12, for example, in compositions comprising Petro 22™ in amounts of at least as little as 0.01% by weight of the carrier in combination with charged H-CNC in amounts of as little as 0.01% by weight of the carrier evidences additive inhibition effects.

Figure 8:
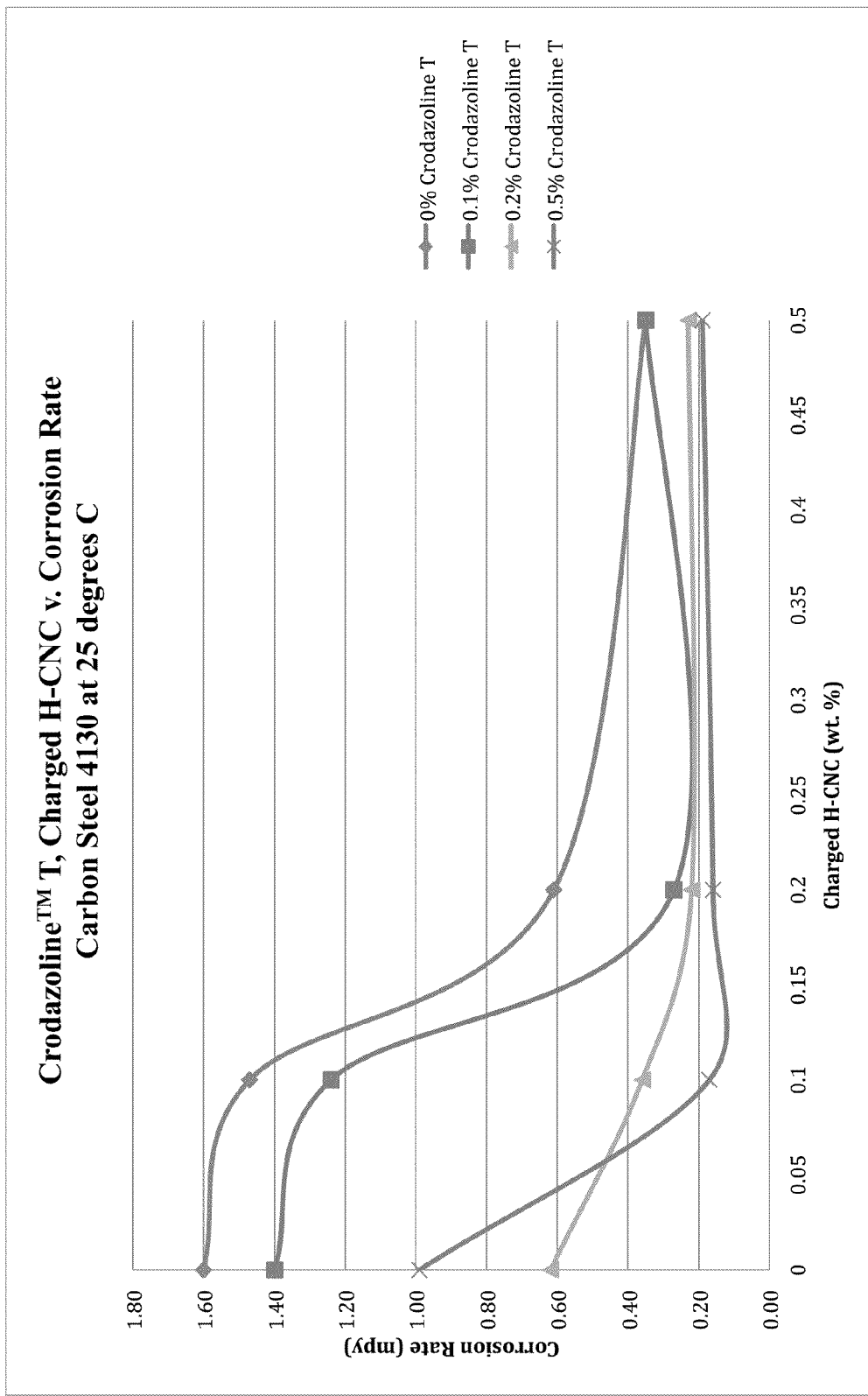
FIG. 8 is a line graph showing the results of another coupon jar test similar to FIG. 1 in which steel coupons were tested at 25 degrees Celsius with various amounts of proprietary inhibitor Crodazoline™ T and charged H-CNC added to the jars.

As seen in Table 7 and FIG. 8, additional testing of steel coupons was performed on proprietary inhibitors from Croda International Plc, including Crodazoline™ T. This inhibitor may be purchased at Croda International Plc, having an address at Cowick Hall, Snaith, Goole, East Yorkshire, DN14 9AA, England. Crodazoline™ T is a low ash, oil soluble inhibitor that may be suitable for a wide range of industries. Crodazoline™ T may comprise tall oil hydroxyethyl imidazoline and alkanolamide. Enhanced corrosion inhibition effects are shown in FIG. 8, for example, in compositions comprising Crodazoline™ T in amounts of at least 0.2% by weight of the carrier and charged H-CNC in amounts of as little as 0.1% by weight of the carrier. As can be seen in the graph, a composition comprising Crodazoline™ T at 0.5% by weight of the carrier and charged H-CNC at 0.1% by weight of the carrier resulted in a particularly notable drop in corrosion.

Figure 13:
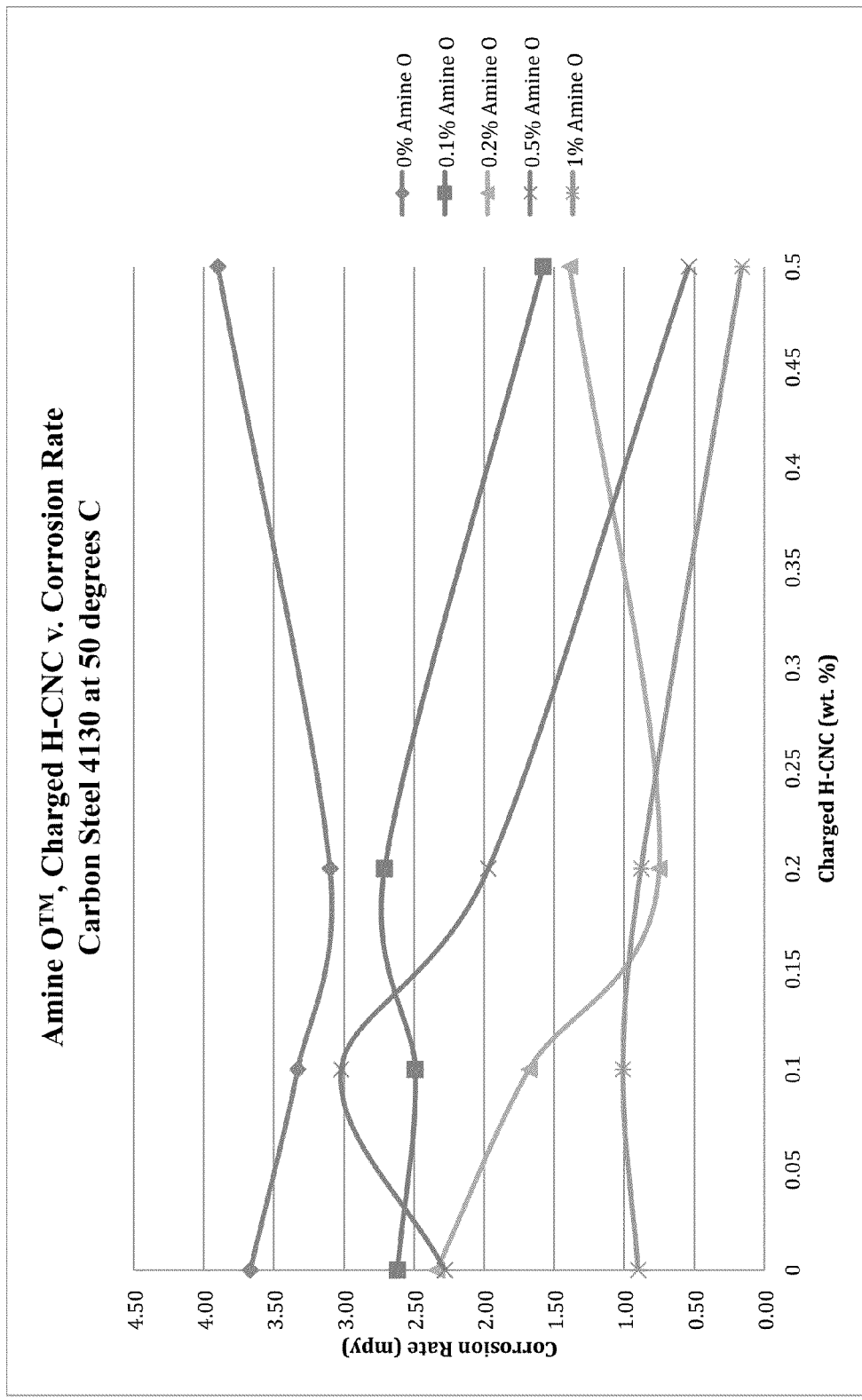
FIG. 13 is a line graph showing the results of yet an additional coupon jar test similar to FIG. 1 in which steel coupons were tested at 50 degrees Celsius with various amounts of proprietary inhibitor Amine O™ and charged H-CNC added to the jars.
Figure 15:
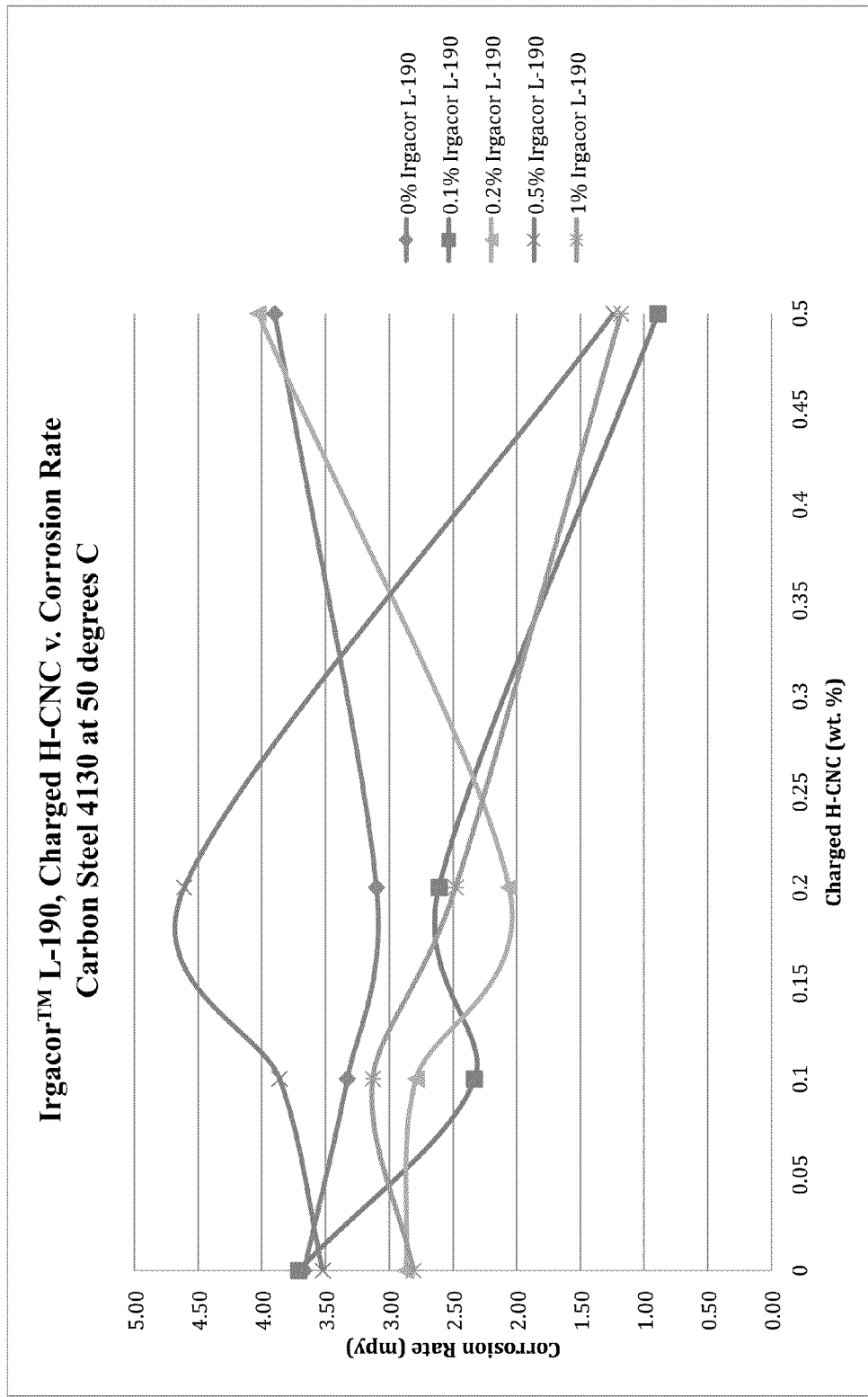
FIG. 15 is a line graph showing the results of a further coupon jar test similar to FIG. 1 in which steel coupons were tested at 50 degrees Celsius with various amounts of proprietary inhibitor Irgacor™ L-190 and charged H-CNC added to the jars.

As seen in Table 9 and FIGS. 13 and 15, further testing of steel coupons was performed on proprietary inhibitors from BASF SE, including Amine O™ and Irgacor™ L-190. These inhibitors may be purchased at BASF SE, having an address at Carl-Bosch-Strasse 38, 67056 Ludwigshafen am Rhein, Germany. Amine O comprises an imidazoline derivative that may be effective for industrial lubricants, greases and rust preventative fluids, aqueous systems, metal working fluids, bitumen, and fuels, for example. Irgacor™ L-190 is a corrosion inhibitor for multimetal systems that may be suitable for all types of water-based systems, including metal working fluids and high water based hydraulic fluids and engine coolants.

Enhanced corrosion inhibition effects are generally shown in FIG. 13 for compositions comprising Amine O™ in amounts of up to at least 1% by weight of the carrier and charged H-CNC in amounts of 0.5% by weight of the carrier, for example. FIG. 13 demonstrates that a composition comprising Amine O™ in amounts of 0.2% by weight of the carrier and charged H-CNC in amounts of about 0.1 to about 0.3% by weight of the carrier may be particularly enhanced in its corrosion inhibition. Enhanced corrosion inhibition is also shown for compositions comprising Amine O™ at 0.5% by weight of the carrier as charged H-CNC is included in amounts over 0.2% by weight of the carrier.

Enhanced corrosion inhibition effects are generally found in FIG. 15 for compositions comprising Irgacor™ L-190 in amounts of up to 1% by weight of the carrier and charged H-CNC in amounts of about 0.5% by weight of the carrier. Also, charged H-CNC at 0.1% of the carrier showed a significant effect on corrosion inhibition when combined with Irgacor™ L-190 at 0.1% by weight of the carrier, for example.

Figure 16:
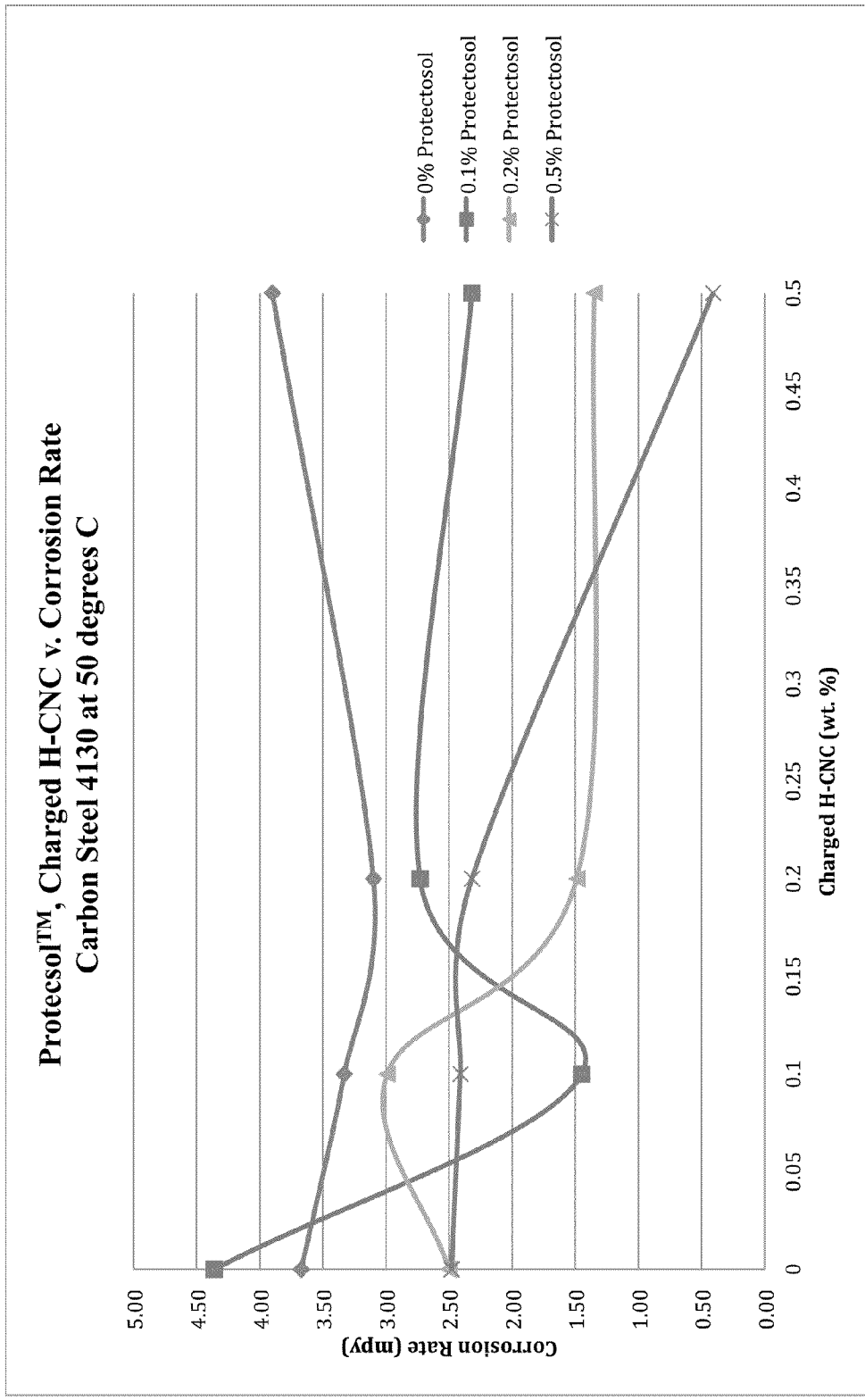
FIG. 16 is a line graph showing the results of an additional coupon jar test similar to FIG. 1 in which steel coupons were tested at 50 degrees Celsius with various amounts of proprietary inhibitor Protecsol™ and charged H-CNC added to the jars.

As seen in Table 9 and FIG. 16, additional testing of steel coupons was performed on the proprietary inhibitor Protecsol™. This inhibitor may be purchased at Acklands-Grainger, having an address at 90 West Beaver Creek Road, Richmond Hill, Ontario, Canada L4B 1E7. Protecsol™ may effectively control corrosion during idle or shutdown times in a variety of water-based systems, including condensers, cooling towers, steam boilers, as well as other hydronic heating, cooling and process systems. Enhanced corrosion inhibition effects are shown in FIG. 16, for example, in compositions comprising Protecsol™ in amounts of up to at least 0.5% by weight of the carrier and charged H-CNC in amounts of up to at least 0.5% by weight of the carrier. As can be seen in the graph, a composition comprising Protecsol™ at 0.1% by weight of the carrier and charged H-CNC at 0.1% by weight of the carrier resulted in a particularly improved drop in corrosion. Enhanced corrosion inhibition is also shown for compositions comprising Protecsol™ at 0.2% by weight of the carrier as charged H-CNC is included in amounts over 0.2% by weight of the carrier.

ADDITIONAL DESCRIPTION

Examples of uses of cellulose nanocrystals for inhibiting corrosion, as well as examples of corrosion-inhibiting compositions, have been described. The following clauses are offered as further description.

(1) The use of charged cellulose nanocrystals for inhibiting corrosion of metals.
(2) The use of clause 1 wherein the metal is ferrous.
(3) The use of any preceding clause wherein the metal is steel.
(4) The use of clause 1 wherein the metal is non-ferrous.
(5) The use of clause 4 wherein the metal is aluminium.
(6) The use of any preceding clause wherein the cellulose nanocrystals have ester groups on the surfaces thereof.
(7) The use of clause 6 wherein the use further includes using acid to impart ester groups on said cellulose nanocrystals.
(8) The use of clause 7 wherein the acid is an inorganic acid.
(9) The use of clause 7 wherein the acid is sulfuric acid.
(10) The use of clause 7 wherein the acid is phosphoric acid.
(11) The use of clause 7 wherein the acid is carboxylic acid.

(12) The use of clause 7 wherein the acid is at least one selective from group of: hydrofluoric acid, hydrochloric acid, hydrobromic acid, hydroiodic acid, halogen oxoacids, hypochlorous acid, chlorous acid, chloric acid, perchloric acid, sulfuric acid, fluorosulfuric acid, nitric acid, phosphoric acid, fluoroantimonic acid, fluoroboric acid, hexafluorophosphoric acid, chromic acid, boric acid, acetic acid, citric acid, formic acid, gluconic acid, lactic acid, oxalic acid, tartaric acid, fluoroacetic acid, trifluoroacetic acid, chloroacetic acid, dichloroacetic acid, trichloroacetic acid, and ascorbic acid.

(13) The use of any preceding clause wherein the cellulose nanocrystals are part of a corrosion inhibiting composition, the composition being adapted to inhibit corrosion by 8% or more.

(14) The use of clause 13, wherein the composition is a colloid comprising a dispersed phase that is solid and a dispersion medium that is liquid, the dispersed phase being said charged cellulose nanocrystals.

(15) The use of clause 14, wherein the dispersion medium includes water in an amount of at least 95% by weight of the composition.

(16) The use of any one of clauses 14 to 15, wherein the plurality of charged cellulose nanocrystals are in an effective corrosion-inhibiting amount equal to or greater than 0.1% by weight of the dispersion medium.

(17) The use of any one of clauses 14 to 16 wherein the charged cellulose nanocrystals are in an amount of equal to or less than 1% by weight of the dispersion medium.

(18) The use of any one of clauses 14 to 16, wherein the plurality of charged cellulose nanocrystals are in an effective corrosion-inhibiting amount equal to or less than 0.6% by weight of the dispersion medium.

(19) The use of any one of clauses 14 to 16, wherein the plurality of charged cellulose nanocrystals are in an effective corrosion-inhibiting amount equal to or less than 0.2% by weight of the dispersion medium.

(20) The use of any preceding clause wherein the cellulose nanocrystals are adapted to inhibit corrosion in salt-water environments.

(21) The use of any preceding clause wherein the cellulose nanocrystals are adapted to inhibit corrosion in brine environments.

(22) The use of any preceding clause wherein the cellulose nanocrystals are adapted to inhibit corrosion in aqueous environments having at least some salt.

(23) The use of any one of clauses 13 to 22 wherein the composition includes a corrosion inhibitor combined in a corrosion effective amount with the charged cellulose nanocrystals.

(24) The use of clause 23, wherein the corrosion inhibitor is of the type adapted for salt-water environments.

(25) The use of clause 23, wherein corrosion inhibitor is of the type adapted for brine environments.

(26) The use of clause 23 wherein the corrosion inhibitor is of the type adapted for oil and gas industry applications.

(27) The use of clause 23 wherein the corrosion inhibitor is of the type adapted for cutting fluids.

(28) The use of any one of clauses 23 to 25, wherein the corrosion inhibitor is biodegradable.

(29) The use of clause 23 wherein the corrosion inhibitor is an azole.

(30) The use of clause 23 wherein the corrosion inhibitor is at least one of the following compounds in a corrosion effective amount: polycarboxilic acid; fatty acid alkanolamide; ammonium benzoate; ethanolamine; monoethaneamine benzoate; ethanol ammonium benzoate; imidazole; tall oil hydroxyethyl imidazoline; 2-imidazoline-1-ethanol, 2-heptadecyl-; 1H-imidazole-1-ethanol, 2-(8-heptadecen-1-yl)-4,5-dihydro-; ethanol, 2-(2-aminoethoxy)-; benzotriazole; and 2-mercaptobenzothiazole; 1,2benzisothiazoline-3-1; 2-benzimidazolone; 4,5,6,7-tetrahydrobenzotrazole; tolylimidazolone; tolyltriazole; and 2(5-ethyl-2-pyridyl)benzimidazole.

(31) The use of any preceding clause wherein the charged cellulose nanocrystals have diameters in the range of about 4 nm to about 60 nm and lengths in the range of about 150 nm to about 350 nm.

(32) A corrosion inhibiting composition for inhibiting corrosion of metals, the composition comprising: a carrier essentially consisting of water; and an effective corrosion-inhibiting amount of charged cellulose nanocrystals, the cellulose nanocrystals being in stabilized aqueous suspension, having diameters in the range of about 4 nm to about 60 nm, and having lengths in the range of about 150 nm to about 350 nm.

(33) The composition of clause 32 wherein the cellulose nanocrystals are in an amount of less than 1% by weight of the carrier.

(34) The composition of clause 32 wherein the plurality of charged cellulose nanocrystals are in an amount equal to or less than 0.6% by weight of the carrier.

(35) The composition of any one of clauses 32 to 34, wherein the plurality of charged cellulose nanocrystals are in an effective amount equal to or less than 0.2% by weight of the carrier.

(36) The composition of any one of clauses 32 to 35 wherein the composition is thin and has a low viscosity.

(37) The composition of any one of clauses 32 to 36, wherein the composition has a viscosity that is no more than 125% of the viscosity of water at ambient temperatures.

(38) The composition of any one of clauses 32 to 37, wherein the composition includes a compound of formula $R_1$-$R_2$ in which $R_1$ is one or ester groups and $R_2$ is a cellulose nanocrystal.

(39) The composition of any one of clauses 32 to 38, wherein the composition functions as a universally effective additive for corrosion inhibitors which enhances corrosion inhibition when combined in an effective amount therewith.

(40) The composition of any one of clauses 32 to 39, wherein the composition further including ammonium benzoate in an amount equal to or less than 5% by weight of the carrier.

(41) A corrosion inhibiting composition for use in inhibiting corrosion of ferrous metals, the composition comprising a plurality of charged cellulose nanocrystals dispersed within a carrier, the cellulose nanocrystals having diameters in the range of about 4 nm to about 60 nm and having lengths equal to or less than 350 nm, and the composition being adapted to enhance corrosion inhibition when used in combination with at least one of the following compounds in a corrosion effective amount: polycarboxilic acid; fatty acid alkanolamide; ammonium benzoate; ethanolamine; monoethaneamine benzoate; ethanol ammonium benzoate; imidazole; tall oil hydroxyethyl imidazoline; 2-imidazoline-1-ethanol, 2-heptadecyl-; 1H-imidazole-1-ethanol, 2-(8-heptadecen-1-yl)-4,5-dihydro-; ethanol, 2-(2-aminoethoxy)-; benzotriazole; and 2-mercaptobenzothiazole.

(42) The composition of clause 41 wherein the composition is further adapted to enhance corrosion inhibition when used in combination with at least one of the fol-

(43) A process for inhibiting corrosion of steel components in contact with a water-containing liquid, the process including obtaining a plurality of charged cellulose nanocrystals via acid hydrolysis, the cellulose nanocrystals so obtained having diameters in the range of about 4 nm to about 60 nm and lengths in the range of about 150 nm to about 350 nm, and adding said plurality of charged cellulose nanocrystals to the liquid in an amount equal to or less than 1% by weight of the liquid.

(44) The use of charged cellulose nanocrystals as a multi-metal, corrosion inhibiting additive for water-containing liquids, the charged cellulose nanocrystals having diameters in the range of about 4 nm to about 60 nm and lengths in the range of about 150 nm to about 350 nm.

(45) The use of clause 44, wherein the cellulose nanocrystals are obtained via acid hydrolysis and are highly crystalline and rigid.

(46) A compound comprising: a cellulose nanocrystals having a surface; an ester group bonded to said surface; and a metal bonded to said ester group.

(47) The compound of clause 46 wherein the metal is ferrous.

(48) The compound of any one of clauses 45 and 46 wherein the metal is steel.

(49) The compound of clause 46 wherein the metal is non-ferrous.

(50) The compound of clause 49 wherein the metal is aluminium.

(51) The compound of clause 46, wherein the metal is an iron atom.

(52) The compound of clause 46 wherein the metal is an aluminium atom.

(53) The compound of any one of clauses 46 to 52 wherein the metal is a cation which bonds to the ester group.

(54) The compound of any one of clauses 46 to 53 wherein the ester is a sulfate ester.

(55) The compound of any one of clauses 46 to 53 wherein the ester is a phosphate ester.

(56) The compound of any one of clauses 46 to 53 wherein the ester is a carboxylic ester.

The word "comprising" as set out the specification and claims is used in an open-ended sense and is synonymous with the word "includes".

It will be understood by someone skilled in the art that many of the details provided above are by way of example only and are not intended to limit the scope of the invention which is to be determined with reference to at least the following claims.

What is claimed is:

1. The use of cellulose nanocrystals as a corrosion inhibitor for inhibiting corrosion of a metal object made of steel, the use comprising:
    using acid to impart ester groups onto the cellulose nanocrystals;
    dispersing an effective corrosion inhibiting amount of said cellulose nanocrystals having said ester groups within a composition comprising a carrier essentially consisting of water, the cellulose nanocrystals being in an amount equal to or greater than 0.1 percent by weight of the carrier and equal to or less than 3.0 percent by weight of the carrier; and
    applying an effective corrosion inhibiting amount of said composition to the metal object, the composition being adapted to inhibit corrosion of said metal object by 8% or more.

2. The use as claimed in claim 1, wherein the cellulose nanocrystals are obtained via acid hydrolysis and wherein the ester groups are negatively charged.

3. The use as claimed in claim 1 wherein the acid is sulfuric acid, each of the cellulose nanocrystals has a surface, the ester groups are imparted onto said surfaces of the cellulose nanocrystals, and the ester groups are negatively charged sulfate ester groups.

4. The use as claimed in claim 1 wherein the acid is phosphoric acid, each of the cellulose nanocrystals has a surface, the ester groups are imparted onto said surfaces of the cellulose nanocrystals, and the ester groups are negatively charged phosphate ester groups.

5. The use as claimed in claim 1 wherein the acid is carboxylic acid, each of the cellulose nanocrystals has a surface, the ester groups are imparted onto said surfaces of the cellulose nanocrystals, and the ester groups are negatively charged carboxylate ester groups.

6. The use as claimed in claim 1 wherein the acid is polycarboxilic acid.

7. The use as claimed in claim 1, wherein the composition further includes an effective corrosion inhibiting amount of at least one of the following compounds: polycarboxilic acid; fatty acid alkanolamide; ammonium benzoate; ethanolamine; monoethaneamine benzoate; ethanol ammonium benzoate; imidazole; tall oil hydroxyethyl imidazoline; 2-imidazoline-1-ethanol, 2-heptadecyl-; 1H-imidazole-1-ethanol, 2-(8-heptadecen-1-yl)-4,5-dihydro-; ethanol, 2-(2-aminoethoxy)-; sodium alkyl naphthalene sulfonate; benzotriazole; 2-mercaptobenzothiazole; 1,2benzisothiazoline-3-1; 2-benzimidazolone; 4,5,6,7-tetrahydrobenzotrazole; tolylimidazolone; tolyltriazole; and 2(5-ethyl-2-pyridyl)benzimidazole.

8. The use as claimed in claim 1 wherein the cellulose nanocrystals have diameters in the range of about 4 nm to about 60 nm and lengths in the range of about 150 nm to about 350 nm.

9. The use as claimed in claim 1 wherein the cellulose nanocrystals are dispersed in a colloidal suspension within the composition in an amount equal to or greater than 0.1 percent by weight of the carrier and equal to or less than 1.0 percent by weight of the carrier.

10. The use as claimed in claim 1 wherein the composition functions to inhibit corrosion by 8% or more when the metal object is exposed to a temperature in the range of about 5 degrees Celsius to about 150 degrees Celsius.

11. The use as claimed in claim 1, wherein the metal object is exposed to a corrosion environment comprising salt.

12. The use as claimed in claim 7, wherein the metal object is exposed to a corrosion environment comprising salt.

13. The use of cellulose nanocrystals as a corrosion inhibitor for inhibiting corrosion of a metal object made of steel, the use comprising:
    imparting ester groups onto the cellulose nanocrystals;
    dispersing an effective corrosion inhibiting amount of said cellulose nanocrystals having said ester groups within a composition comprising a carrier essentially consisting of water, the cellulose nanocrystals being in an amount equal to or greater than 0.1 percent by weight of the carrier and equal to or less than 3.0 percent by weight of the carrier; and applying an effective corrosion inhibiting amount of said composition to the metal object, the composition being adapted to inhibit corrosion of said metal object by 8% or more.

14. The use as claimed in claim 13, wherein the ester groups are negatively charged.

15. The use as claimed in claim 13, wherein the composition further includes an effective corrosion inhibiting amount of at least one of the following compounds: polycarboxilic acid; fatty acid alkanolamide; ammonium benzoate; ethanolamine; monoethaneamine benzoate; ethanol ammonium benzoate; imidazole; tall oil hydroxyethyl imidazoline; 2-imidazoline-1-ethanol, 2-heptadecyl-; 1H-imidazole-1-ethanol, 2-(8-heptadecen-1-yl)-4,5-dihydro-; ethanol, 2-(2-aminoethoxy)-; sodium alkyl naphthalene sulfonate; benzotriazole; 2-mercaptobenzothiazole; 1,2benzisothiazoline-3-1; 2-benzimidazolone; 4,5,6,7-tetrahydrobenzotrazole; tolylimidazolone; tolyltriazole; and 2(5-ethyl-2-pyridyl)benzimidazole.

16. The use as claimed in claim 13, wherein the composition functions to inhibit corrosion by 8% or more when the metal object is exposed to temperature and pressure conditions that enable the composition to remain in liquid form.

17. The use as claimed in claim 13 wherein the composition functions to inhibit corrosion by 8% or more when the metal object is exposed to a temperature in the range of about 5 degrees Celsius to about 150 degrees Celsius.

18. The use as claimed in claim 13, wherein the metal object is exposed to a corrosion environment comprising salt.

19. The use of cellulose nanocrystals as a corrosion inhibitor for inhibiting corrosion of a metal object made of aluminium, the use comprising:
    using acid to impart ester groups onto the cellulose nanocrystals;
    dispersing an effective corrosion inhibiting amount of said cellulose nanocrystals having said ester groups within a composition comprising a carrier essentially consisting of water, the cellulose nanocrystals being in an amount equal to or greater than 0.2 percent by weight of the carrier and equal to or less than 2.0 percent by weight of the carrier; and
    applying an effective corrosion inhibiting amount of said composition to the metal object, the composition being adapted to inhibit corrosion of said metal object by 38% or more.

20. The use as claimed in claim 19 wherein the composition functions to inhibit corrosion by between 38% and 71% when the metal object is exposed to a temperature of 35 degrees Celsius.

* * * * *